(12) United States Patent
Whitehead

(10) Patent No.: US 6,898,311 B2
(45) Date of Patent: May 24, 2005

(54) DIGITAL IMAGE TRANSMISSION WITH COMPRESSION AND DECOMPRESSION

(76) Inventor: Jeffrey A. Whitehead, 6441 Valley View Rd., Oakland, CA (US) 94611

(\*) Notice: Subject to any disclaimer, the term of this patent is extended or adjusted under 35 U.S.C. 154(b) by 662 days.

(21) Appl. No.: 10/040,228

(22) Filed: Oct. 26, 2001

(65) Prior Publication Data

US 2003/0081846 A1 May 1, 2003

(51) Int. Cl.[7] .............................. G06K 9/00; G06K 9/36
(52) U.S. Cl. ........................................ 382/166; 382/237
(58) Field of Search ................................ 382/162, 164, 382/166, 232, 233, 237, 240, 244, 248, 251; 375/240.24; 358/400, 500, 517, 523, 530

(56) References Cited

U.S. PATENT DOCUMENTS

| | | | |
|---|---|---|---|
| 4,580,134 A | | 4/1986 | Campbell et al. ............ 345/589 |
| 4,878,130 A | \* | 10/1989 | Shimizu et al. ............. 358/400 |
| 5,014,272 A | \* | 5/1991 | Yoshida ....................... 370/513 |
| 5,070,532 A | | 12/1991 | Faul et al. ................... 382/166 |
| 5,247,589 A | | 9/1993 | Faul et al. ................... 382/166 |
| 5,463,701 A | \* | 10/1995 | Kantner, Jr. et al. ......... 382/166 |
| 5,585,944 A | \* | 12/1996 | Rodriguez ................... 358/500 |
| 5,793,892 A | | 8/1998 | Pan et al. .................... 382/232 |
| 5,805,293 A | \* | 9/1998 | Mochizuki ................... 382/248 |
| 5,828,361 A | | 10/1998 | Gibson ........................ 345/600 |
| 6,003,049 A | \* | 12/1999 | Chiang ........................ 715/535 |
| 6,072,830 A | \* | 6/2000 | Proctor et al. ........... 375/240.22 |
| 6,195,391 B1 | \* | 2/2001 | Hancock et al. ........ 375/240.24 |
| 6,225,973 B1 | | 5/2001 | Hill et al. .................... 345/589 |

\* cited by examiner

*Primary Examiner*—Andrew W. Johns
*Assistant Examiner*—Amir Alavi
(74) *Attorney, Agent, or Firm*—Schmeiser, Olsen & Watts

(57) ABSTRACT

A method and system for transmitting a digital image (i.e., an array of pixels) from a digital image source to a digital image receiver. The array of pixels is converted into Image Line Bit Patterns by Frame Decomposition. Then each Image line Bit Pattern independently transformed into a corresponding Bit Mask Indicator by Image Line Encoding, followed by generation of a bit stream that includes Bit Stream Header Information and the Bit Mask Indicators. The Bit Stream Header Information includes Constant Digital Image Data. The bit stream is transmitted over a data path to the digital image receiver where the Bit Mask Indicators in the bit stream are parsed and the Bit Mask Indicators are translated into corresponding Image Line Bit Patterns. Then the digital image is restored from the Image Line Bit Patterns by Frame Recreation.

49 Claims, 20 Drawing Sheets

| ↓HIBP* | BIT POSITIONS FOR COLOR HUES | | | | | |
|---|---|---|---|---|---|---|
| | 0 | 1 | 2 | 3 | 4 | 5 |
| a | 1 | | | | | |
| b | | 1 | | | | |
| c | | | 1 | | | |
| d | | | | 1 | | |
| e | | | | | | |
| f | | | | | | |
| g | | | | | | |
| h | | | | | | |
| i | | | | | | |
| j | | | | | | |
| k | | | | | | |
| l | | | | | | |
| m | | | | | | |
| n | | | | | | |
| o | | | | | | |
| p | | | | | 1 | 1 |

* HIBP: HUE INTENSITY BIT PATTERN

FIG. 8

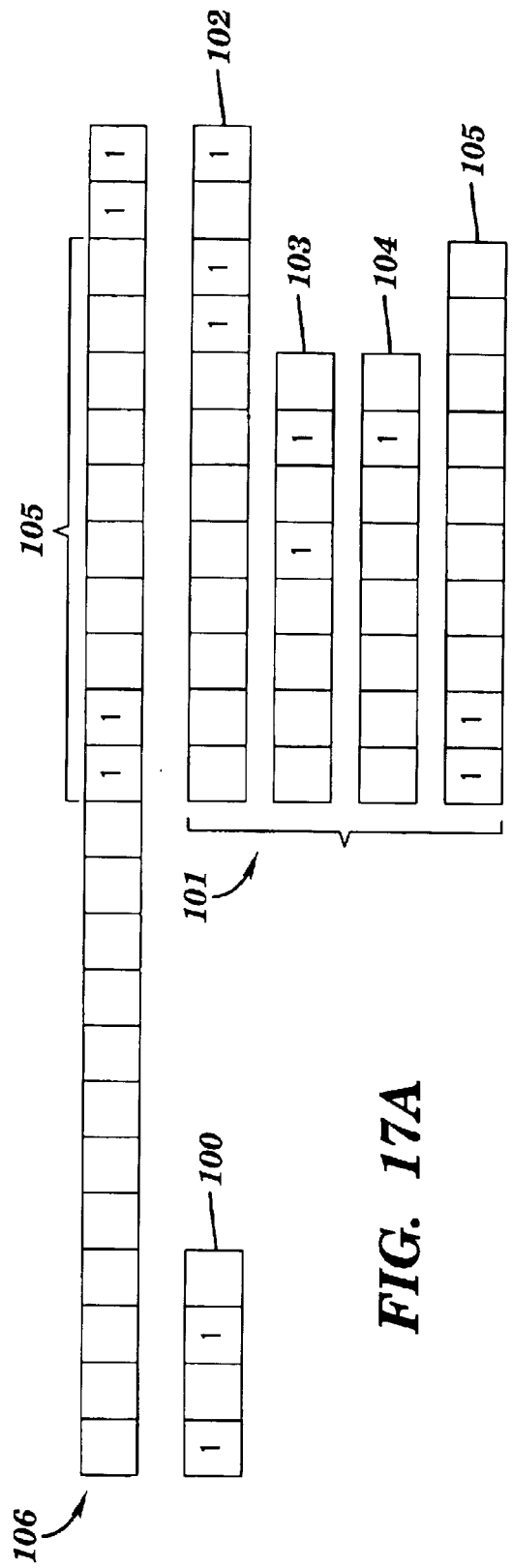
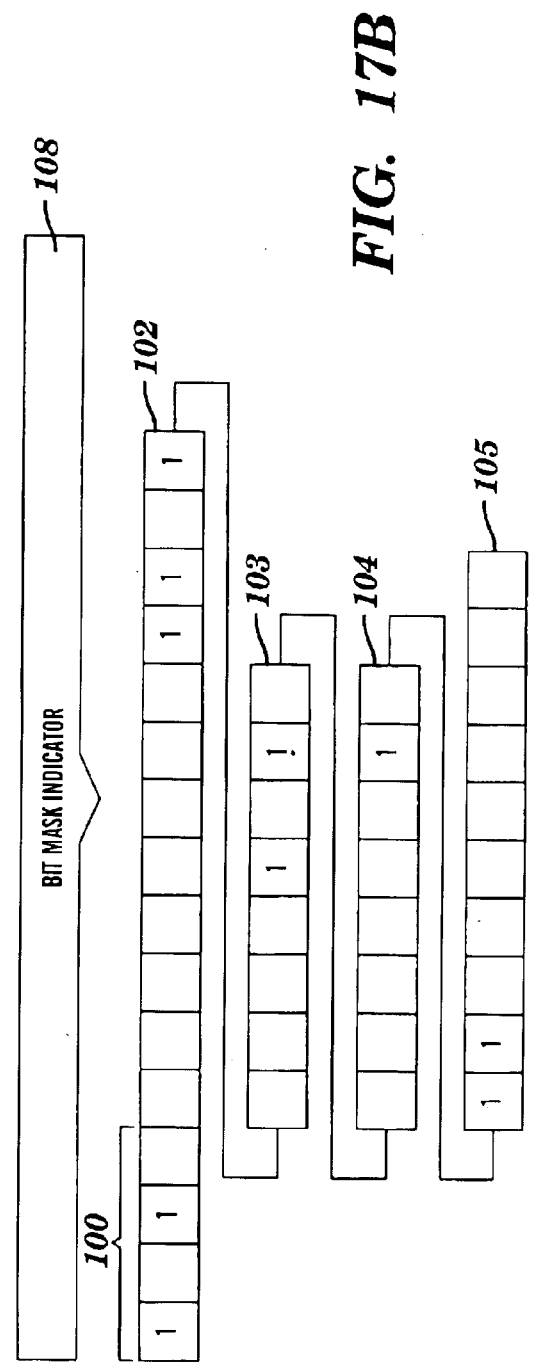
FIG. 17A
FIG. 17B

DIGITAL IMAGE TRANSMISSION WITH COMPRESSION AND DECOMPRESSION

BACKGROUND OF THE INVENTION

1. Technical Field

The present invention relates to a method and system for compression, and subsequent decompression, of a video image.

2. Related Art

A two-dimensional image of video data may be transferred from a first location to a second location over a data communication path or network (e.g., telephone lines, cable, etc.). Such video data may be compressed prior to such data transfer, and decompressed following such data transfer, in order to reduce the transmission time for completing such data transfer. The compression is either lossless compression or lossy compression. With lossless compression, the video data after being compressed and decompressed, is bit-by-bit identical to the original image of video data. With lossy compression, the video data after being compressed and decompressed, is not bit-by-bit identical to the original image of video data. With the current state of the art, lossy compression can have a significantly higher compression factor (i.e., number of bits of original image/number of bits of compressed image) than does lossless compression. However with lossy compression, the decompressed image is not identical to the original image and the decompressed image is thus degraded in quality relative to the original image.

Thus, there is a need for a method and computer system for accomplishing lossless compression such that the compression factor is high.

SUMMARY OF THE INVENTION

A first aspect of the present invention provides a method for compressing a digital image, comprising:

providing the digital image in terms of an array of pixels;

converting the digital image into Image Line Bit Patterns by Frame Decomposition of the array of pixels; and independently transforming each Image line Bit Pattern into a corresponding Bit Mask Indicator by Image Line Encoding.

A second aspect of the present invention provides a method for transmitting a digital image from a digital image source to a digital image receiver, comprising:

providing at the digital image source the digital image in terms of an array of pixels;

converting the digital image into Image Line Bit Patterns by Frame Decomposition of the array of pixels;

independently transforming each Image line Bit Pattern into a corresponding Bit Mask Indicator by Image Line Encoding;

generating a bit stream that includes Bit Stream Header Information and the Bit Mask Indicators, wherein the Bit Stream Header Information includes Constant Digital Image Data;

transmitting the bit stream over a data path to the digital image receiver;

parsing the bit stream, including parsing the Bit Mask Indicators;

translating the Bit Mask Indicators into corresponding Image Line Bit Patterns; and restoring the digital image from the Image Line Bit Patterns by Frame Recreation.

A third aspect of the present invention provides a system for compressing a digital image, comprising:

providing the digital image in terms of an array of pixels;

means for converting the digital image into Image Line Bit Patterns by Frame Decomposition of the array of pixels; and means for independently transforming each Image line Bit Pattern into a corresponding Bit Mask Indicator by Image Line Encoding.

A fourth aspect of the present invention provides a system for transmitting a digital image from a digital image source to a digital image receiver, comprising:

providing at the digital image source the digital image in terms of an array of pixels;

means for converting the digital image into Image Line Bit Patterns by Frame Decomposition of the array of pixels;

means for independently transforming each Image line Bit Pattern into a corresponding Bit Mask Indicator by Image Line Encoding;

means for generating a bit stream that includes Bit Stream Header Information and the Bit Mask Indicators, wherein the Bit Stream Header Information includes Constant Digital Image Data;

means for transmitting the bit stream over a data path to the digital image receiver;

means for parsing the bit stream, including parsing the Bit Mask Indicators;

means for translating the Bit Mask Indicators into corresponding Image Line Bit Patterns; and means for restoring the digital image from the Image Line Bit Patterns by Frame Recreation.

A fifth aspect of the present invention provides a system for compressing a digital image, comprising:

a digital image source adapted to generate the digital image in terms of an array of pixels; and compression algorithms adapted to convert the digital image into Image Line Bit Patterns by Frame Decomposition of the array of pixels and to independently transform each Image line Bit Pattern into a corresponding Bit Mask Indicator by Image Line Encoding.

A sixth aspect of the present invention provides a computer network for transmitting a digital image, expressed as an array of pixels, from a digital image source to a digital image receiver, comprising:

a first computer system comprising compression algorithms adapted to: convert the digital image into Image Line Bit Patterns by Frame Decomposition of the array of pixels, independently transform each Image line Bit Pattern into a corresponding Bit Mask Indicator by Image Line Encoding, and generate a bit stream that includes Bit Stream Header Information and the Bit Mask Indicators, wherein the Bit Stream Header Information includes Constant Digital Image Data;

means for transmitting the bit stream from the first computer system to a second computer system; and the second computer system comprising decompression algorithms adapted to: parse the bit stream such that each Bit Mask Indicator is isolated, translate the Bit Mask Indicators into corresponding Image Line Bit Patterns, and restore the digital image from the Image Line Bit Patterns by Frame Recreation.

A seventh aspect of the present invention provides a computer program product, comprising a computer usable medium having a computer readable program code embodied therein, wherein the computer readable program code includes algorithms selected from the group consisting of compression algorithms, decompression algorithms, and a combination thereof:

wherein the compression algorithms are adapted to: convert the digital image into Image Line Bit Patterns by Frame Decomposition of the array of pixels, independently transform each Image line Bit Pattern into a corresponding Bit Mask Indicator by Image Line Encoding, and generate a bit stream that includes Bit Stream Header Information and the Bit Mask Indicators, wherein the Bit Stream Header Information includes Constant Digital Image Data; and wherein the decompression algorithms are adapted to: parse the bit stream such that each Bit Mask Indicator is isolated, translate the Bit Mask Indicators into corresponding Image Line Bit Patterns, and restore the digital image from the Image Line Bit Patterns by Frame Recreation.

The present invention provides methods and systems for accomplishing lossless compression such that the compression factor is high.

BRIEF DESCRIPTION OF THE DRAWINGS

FIG. 8 identifies Hue Intensity Bit Patterns in bit positions of color components for a pixel of the pixel row of FIG. 7, in accordance with embodiments of the present invention.

FIG. 17A illustrates the "Repeating" Bit Assignment Function, in accordance with embodiments of the present invention.

FIG. 17B shows the Bit Mask Indicator associated with the Bit Assignment Function of FIG. 17A, wherein the Bit Mask Indicator is shown as a concatenation of the Bit Assignment Function Identifier and the Bit Assignment Function Data, in accordance with embodiments of the present invention.
in accordance with embodiments of the present invention.

DETAILED DESCRIPTION OF THE INVENTION

Figure 1:
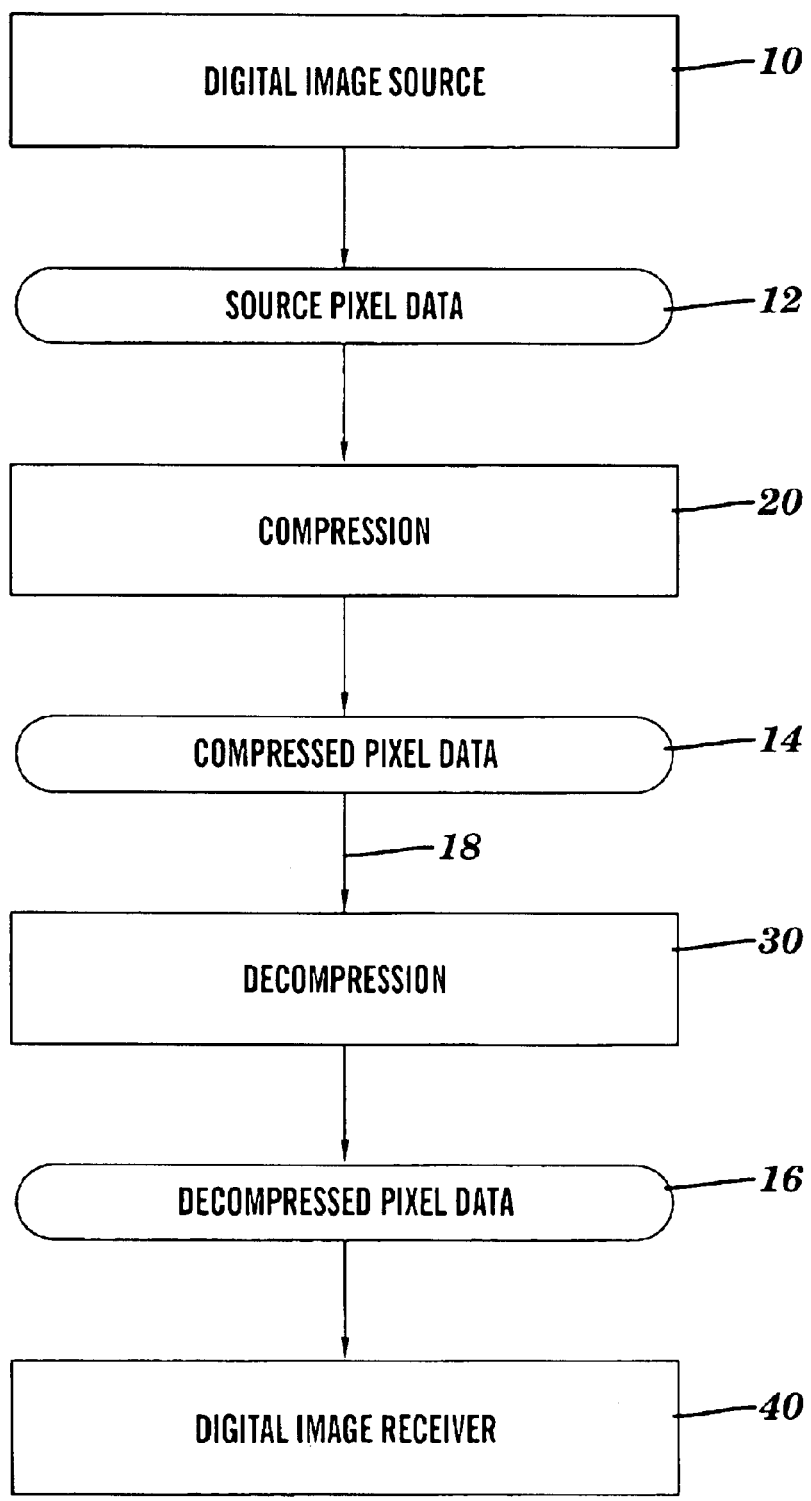
FIG. 1 is a block diagram depicting transmission with compression, and subsequent decompression, of a digital image from a digital image source to a digital image receiver, in accordance with embodiments of the present invention.

FIG. 1 is a block diagram depicting transmission of a digital image from a digital image source 10 to a digital image receiver 40, in accordance with embodiments of the present invention. The digital image at the digital image source 10 may be represented as two-dimensional source pixel data 12, which undergoes compression 20, resulting in compressed pixel data 14 that is transmitted over a data path 18 to a destination. At the destination, the compressed pixel data 14 undergoes decompression 30, resulting in decompressed pixel data 16 that is received at the digital image receiver 40. The decompressed pixel data 16 at the digital image receiver 40 is identical to the pixel data 14 at the digital image source 10, in accordance with lossless compression of the present invention. The digital image source 10 includes any source capable of being represented as two-dimensional pixel data such, inter alia, as direct video data from a video display screen, a data file that includes a two-dimensional image or graphic (e.g., a single image frame as with a still image), a streaming sequence of two-dimensional images such as might occur dynamically in real time, pixel changes between image frames as with motion pictures, etc. The digital image receiver 12 may likewise include, inter alia, a video display screen, a data file, etc. The data path 18 comprises any data communication path or network such as, inter alia, cable, telephone lines, electrical lines, wireless communication, etc. As an example, the data path 18 may comprise the Internet.

Figure 2:
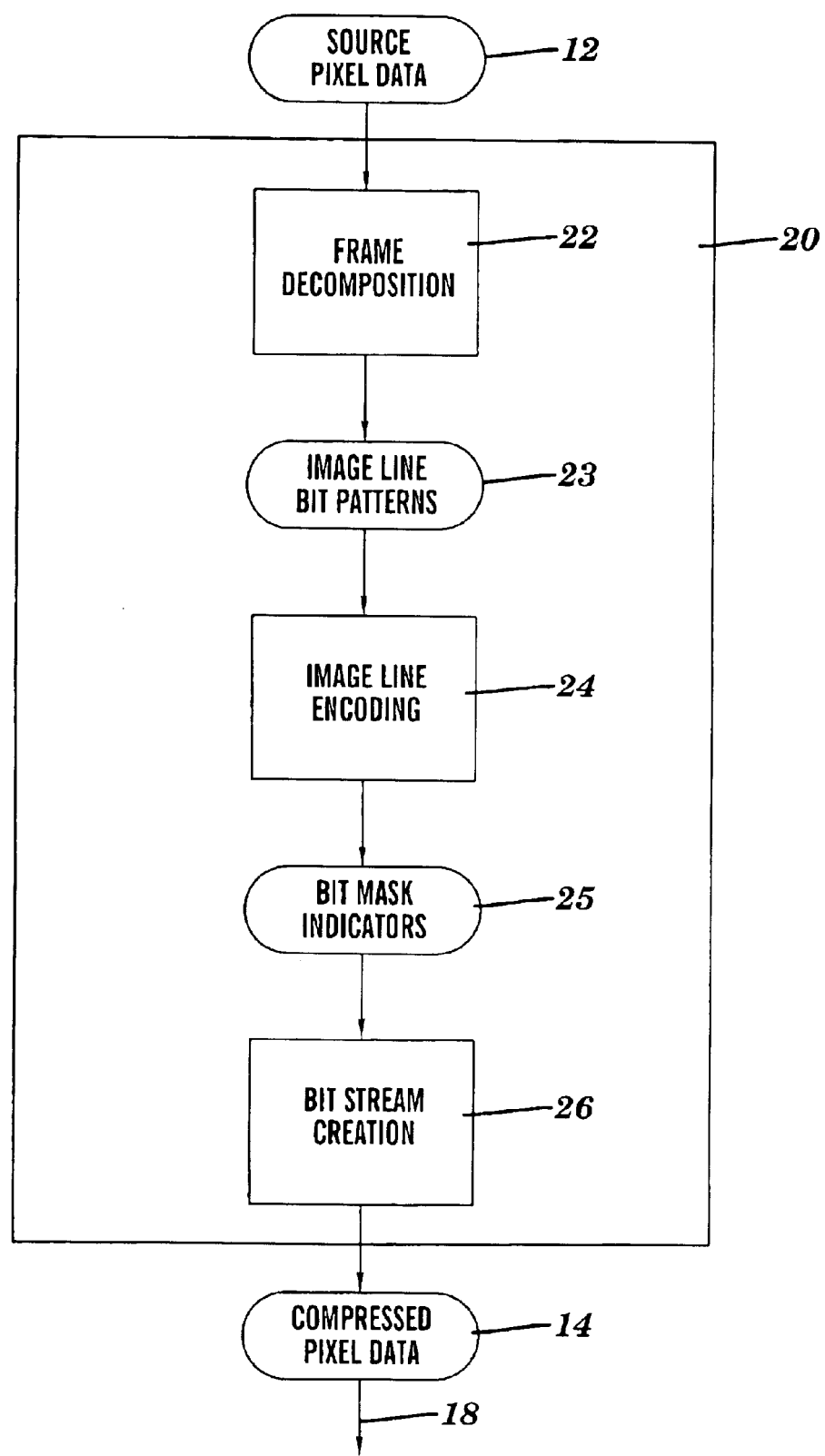
FIG. 2 is a block diagram detailing the compression of FIG. 1.

FIG. 2 is a block diagram detailing the compression 20 of FIG. 1, in accordance with embodiments of the present invention. The compression 20 of the source pixel data 12 includes Frame Decompostion 22, Image Line Encoding 24, and Bit Stream Creation 26. The Frame Decompostion 22 represents the source pixel data 12 as arrays of binary bits, wherein a binary bit may be represented as a 0 or 1. Such arrays of binary bits are called Image Line Bit Patterns 23. The Image Line Encoding 24 compresses the Image Line Bit Patterns 23 into smaller packets of binary bits, called Bit Mask Indicators 25. The Bit Stream Creation 26 aggregates the Bit Mask Indicators 25, together with other data that characterizes general aspects of the source pixel data 12, to generate a bit stream of compressed pixel data 14 that is ready to be transmitted over the data path 18 to the destination at which the digital image receiver 40 (see FIG. 1) is located.

Figure 3:
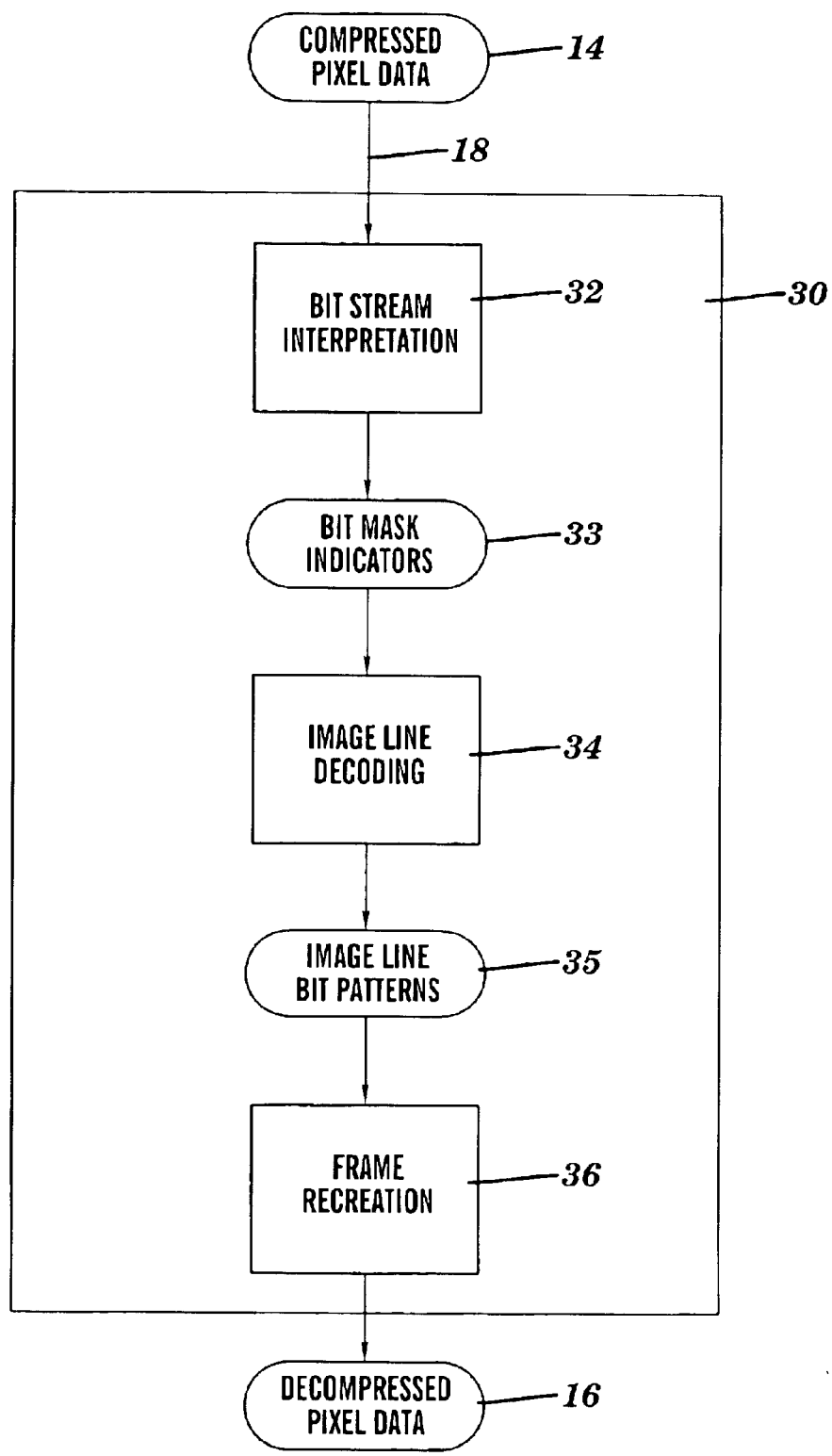
FIG. 3 is a block diagram detailing the decompression of FIG. 1.

FIG. 3 is a block diagram detailing the decompression 30 of FIG. 1, in accordance with embodiments of the present invention. The decompression 30 of the compressed pixel data 14 occurs at the destination at which the digital image receiver 40 is located. The decompression 30 includes bit stream interpretation 32, image line decoding 34, and Frame Recreation 36. The Bit Stream Interpretation 32 parses the bit stream into Bit Mask Indicators 33, which are the same Bit Mask Indicators 25 that are shown in FIG. 2. In FIG. 3, the image line decoding 34 translates the Bit Mask Indicators 33 into the Image Line Bit Patterns 35. The Image Line Bit Patterns 35 are the same Image Line Bit Patterns 23 that are shown in FIG. 2. The Frame Recreation 36 transforms the Image Line Bit Patterns 35 into the decompressed pixel data 16.

The following discussion describes in detail the steps in FIGS. 2–3 of: Frame Decompostion 22, Image Line Encoding 24, Bit Stream Creation 26, Bit Stream Interpretation 32, Image Line Decoding 34, and Frame Recreation 36.

Frame Decomposition

The digital image source 10 of FIG. 1 displays an image in terms of pixels on a two-dimensional plane. The pixels are depicted in a Cartesian coordinate system that comprises a horizontal axis (X) and a vertical axis (Y). A "color" at a pixel is an additive combination of color components, such as red, green, and blue. Each such color component (also called a "color hue") is assigned a "color intensity" represented by an integer, such as an integer between 0 and 255 which is digitally represented by 1 byte consisting of 8 bits. Generally, the number of distinct color intensities available to each color component is $2^B$, wherein B is the number of bits used for describing the color intensity of a given color component. In the preceding example, B=8 and $2^8$=256.

For each color component (e.g., red, green, or blue), a color hue of 0 represents a minimum color intensity, and a color hue of 255 represents a maximum color intensity. In the preceding example, the total number of displayable colors is 16,777, 216 (i.e., $256^3$), since each color component may have 256 unique color intensities. Generally, the total number of displayable colors is $I^C$, where C is the number of color components at each pixel, and I is the number of unique color intensities available to each color component. In the preceding example, I=256 (based on 1 byte) and C=3 (based on 3 color components).

Figure 4:
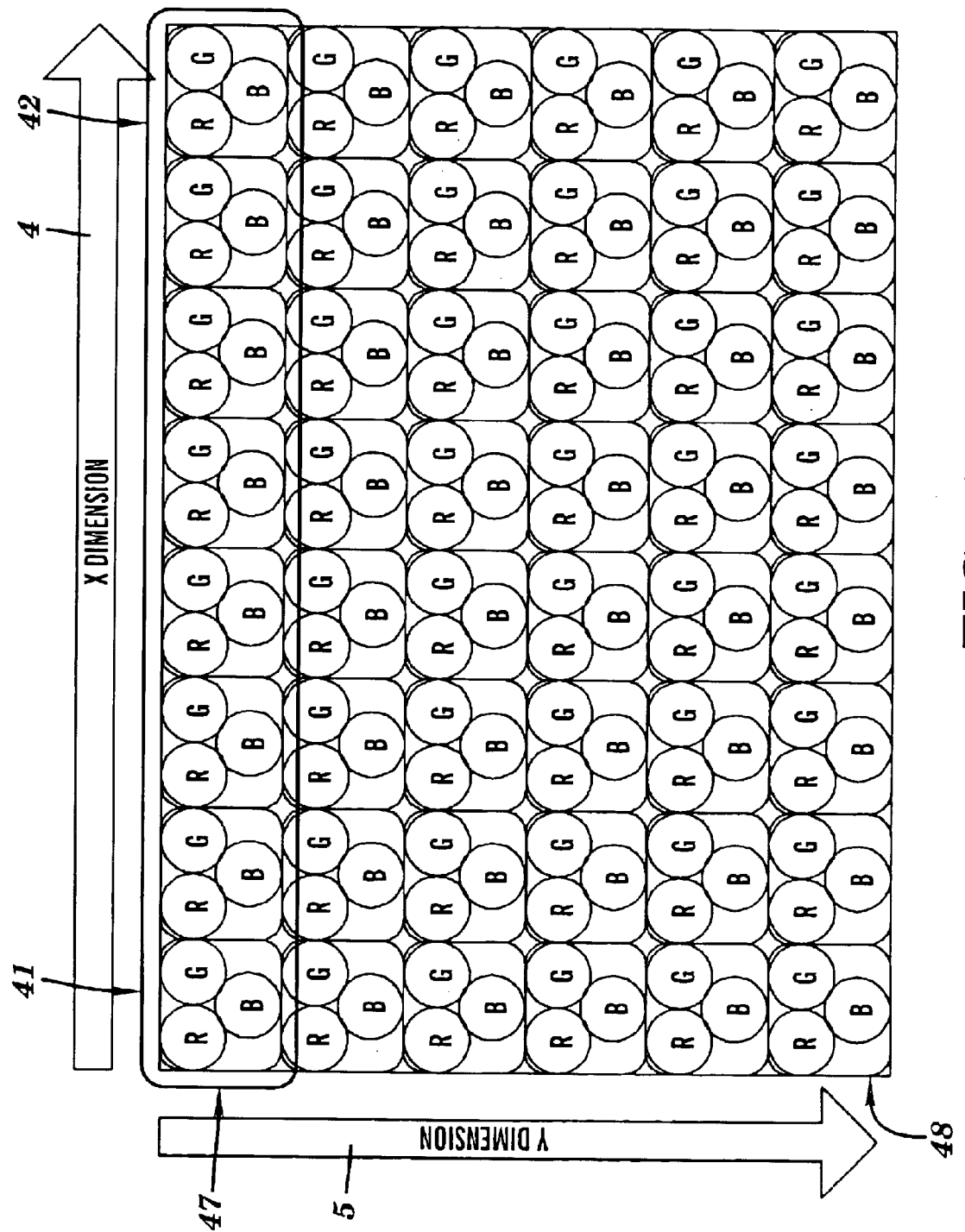
FIG. 4 depicts the digital image source of FIG. 1 as represented by pixel rows, wherein each pixel has a color that is an additive combination of color components, in accordance with embodiments of the present invention.
Figure 5:
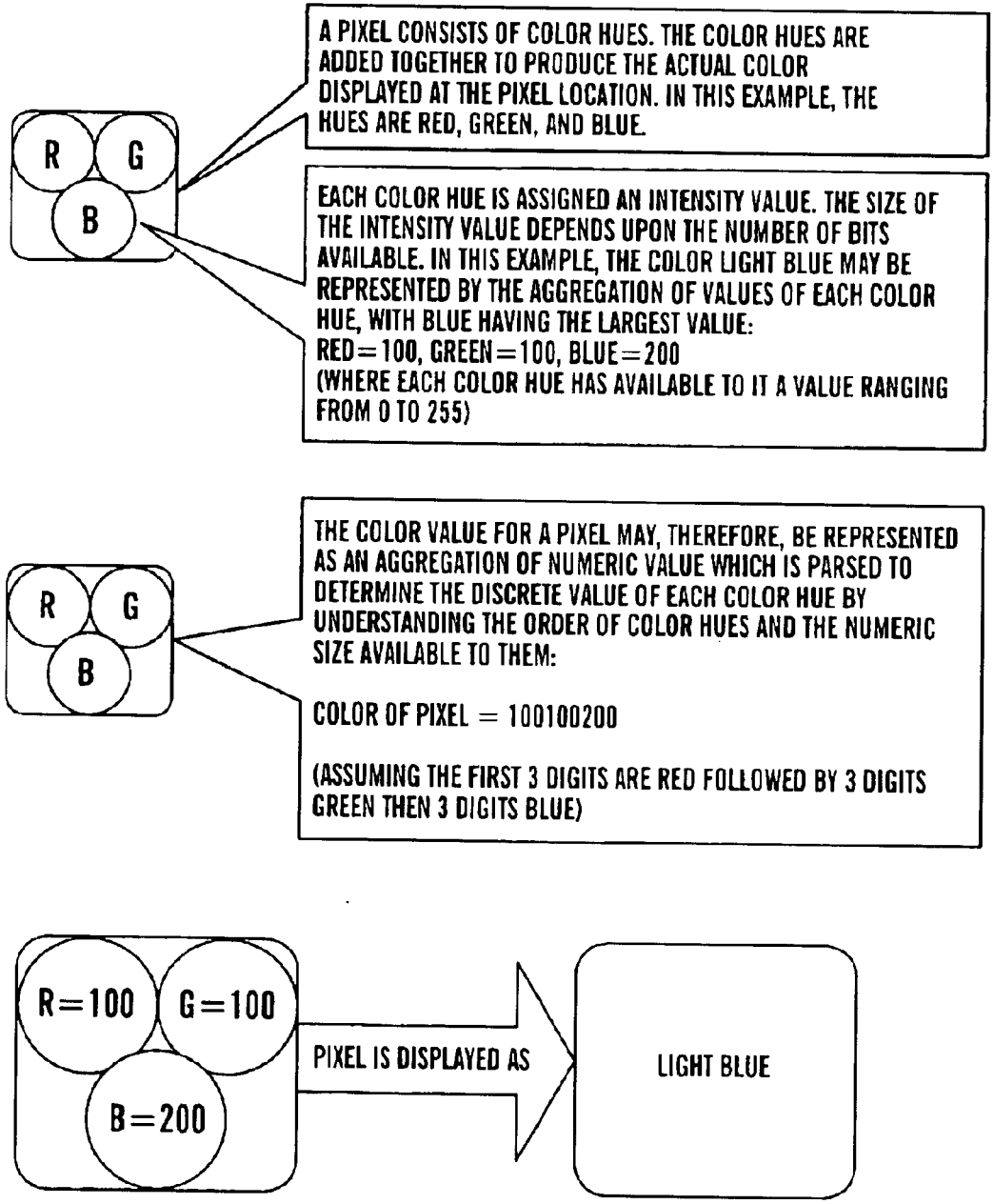
FIG. 5 depicts the creation of color through aggregation of color components, in accordance with embodiments of the present invention.

FIG. 4 illustrates how the digital image source 10 of FIG. 1 is represented by pixel rows, wherein each pixel has a color that is an additive combination of red (R), green (G), and blue (B), in accordance with embodiments of the present invention. Displaying red, green, and blue together, each at maximum color intensity of 255 for a single pixel produces white. Displaying red, green, and blue together, each at minimum color intensity of 0 for a single pixel produces black. All colors between black and white are produced by color component combinations for (red, green, blue) between (0, 0, 0) and (255, 255, 255). For example, illuminating a pixel with the color light blue could be achieved by assigning the color intensities of (100, 100, 200); i.e., 100 to red, 100 to green, and 200 to blue. Under a convention in which red, green and blue are understood to appear in sequence, light blue may be represented as 100100200. Since the color components combine in equal quantities to produce white, emphasizing blue, in contrast to red and green, results in a color of blue with white, or light blue. FIG. 5 illustrates the preceding example of displaying a pixel in the color of light blue as the aforementioned aggregate of red (R)(100), green (G)(100), and blue (B) (200), in accordance with embodiments of the present invention.

For 640 horizontal pixels in the X direction and 480 vertical pixels in the Y direction, an image is displayed in 307,200 pixels (i.e., 640×480), and may therefore be displayed using a maximum of 307,200 unique colors out of the available palette of 16,777, 216 colors. Thus, an image in such a 640×480 pixel environment is described by 921,600 bytes (or approximately 1 Megabyte) of information (i.e., 307,200 pixels×3 color components/pixel×1 byte/color component). The present invention discloses a lossless compression scheme that reduces the number of bits required to represent the image (which includes approximately 1 Megabyte of information in the preceding example of 640×480 pixels) by more than 90%.

As stated supra, each color component includes $2^B$ color intensities, wherein B is the number of bits allocated to describe the color intensity of each color component. If an integer P exists such that B modulus P=0, then the B bits can be divided into B/P Hue Intensity Bit Patterns such that each Hue Intensity Bit Pattern comprises P bits selected from $2^P$ unique Hue Intensity Bit Patterns. Generally, B≧1 and 1≦P≦B. Note that Hue Intensity means color component intensity.

Figure 6:
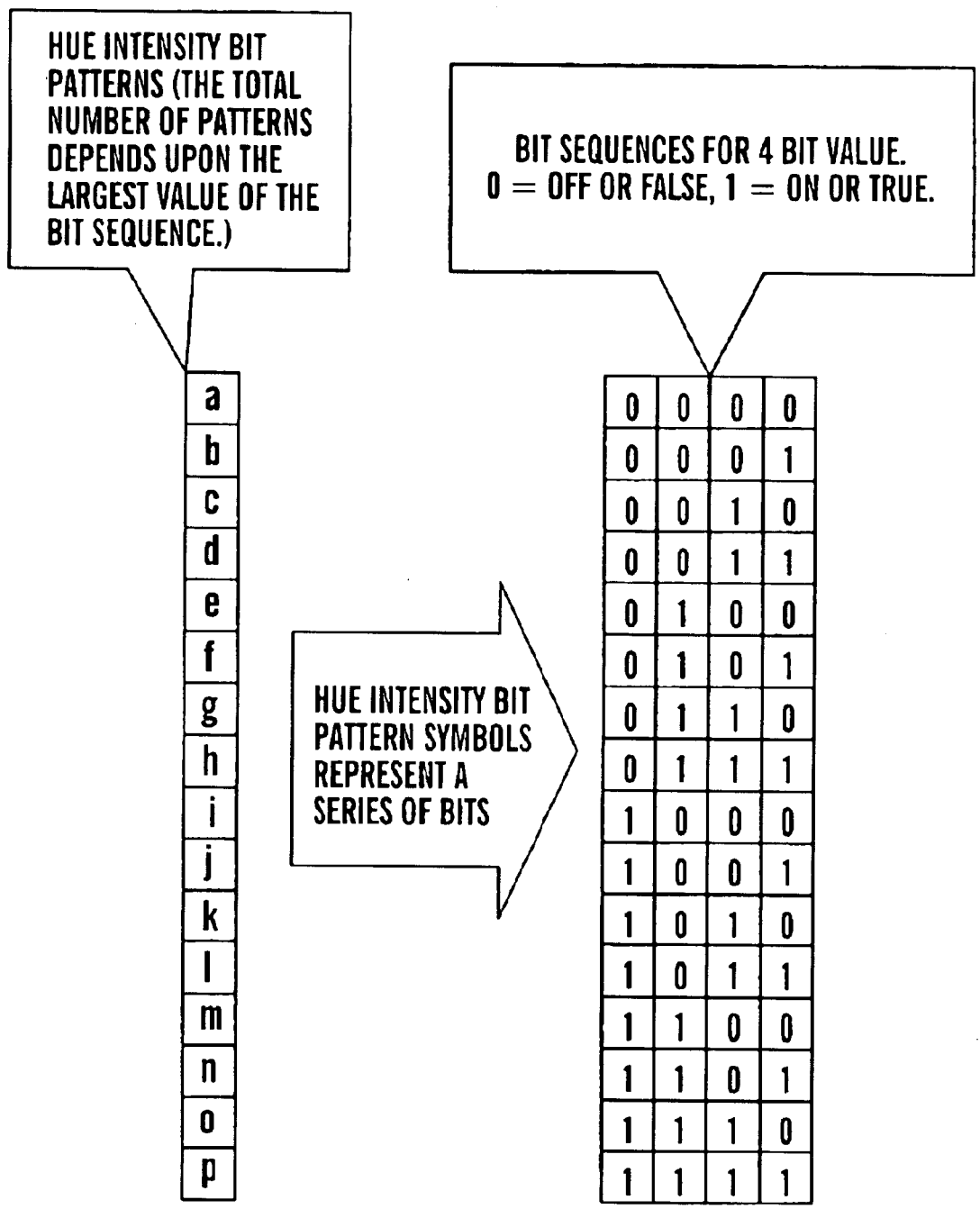
FIG. 6 depicts assigning values to Hue Intensity Bit Patterns, in accordance with embodiments of the present invention.

In accordance with embodiments of the present invention, FIG. 6 illustrates the case B=8 and P=4, which defines 256 color intensities (i.e., $2^B=2^8=256$) of each color component, and 16 Hue Intensity Bit Patterns (i.e., $2^P=2^4=16$), denoted as "a", "b", "c", . . . , "p" representing 0000, 0001, 0010, . . . , 1111, respectively. Each color is described by 2 Hue Intensity Bit Patterns (i.e., B/P=2). As an example, the hue intensity of 100 in decimal is represented as 01100100 in 8-bit binary and may be further represented as "ge" in the Hue Intensity Bit Pattern notation of FIG. 6, since "g" is equivalent to 0110 and "e" is equivalent to 0100. Thus, the hue intensity of 100 (decimal) or 01100100 (binary) is represented as 2 Hue Intensity Bit Patterns, namely "g" followed by "e". As another example, the hue intensity of 200 in decimal is represented as 11001000 in 8-bit binary and may be further represented as "mi" in the Hue Intensity Bit Pattern notation of FIG. 6, since "m" is equivalent to 1100 and "i" is equivalent to 1000. Thus, the hue intensity of 200 (decimal) or 11001000 (binary) is represented as 2 Hue Intensity Bit Patterns, namely "m" followed by "i". Accordingly, light blue has the decimal representation of 100100200, the binary representation of 01100100 01100100 11001000, and the equivalent Hue Intensity Bit Pattern representation of "gegemi".

The preceding example with B=8 and P=4 is merely illustrative. As another example, consider the case of B=12 and P=3, which defines 4096 color intensities (i.e., $2^{12}$ color intensities) for each color component and divides each 12-bit color intensity into 4 Hue Intensity Bit Patterns (i.e., B/P=12/3=4) with each Hue Intensity Bit Pattern described by 3 bits (i.e., P=3). There 8 unique Hue Intensity Bit Patterns, namely 000, 001, 010, 011, 100, 101, 110, and 111 denoted respectively as $T_1$, $T_2$, $T_3$, $T_4$, $T_5$, $T_6$, $T_7$, $T_8$. As an example, the hue intensity of 100 in decimal is represented as 000001100100 in 12-bit binary notation and may be further represented as "$T_1 T_2 T_5 T_5$" in the Hue Intensity Bit Pattern notation of this example, since "$T_1$" is equivalent to 000, "$T_2$" is equivalent to 001, and "$T_5$" is equivalent to 100. Thus, the hue intensity of 100 (decimal) or 000001100100 (binary) is represented as 4 Hue Intensity Bit Patterns, namely "$T_1$" followed by "$T_2$", "$T_5$", and "$T_5$" in sequence.

As another example, B=P=1 defines 2 unique Hue Intensity Bit Patterns (i.e., 0 and 1) corresponding to the colors of black and white.

Figure 7:
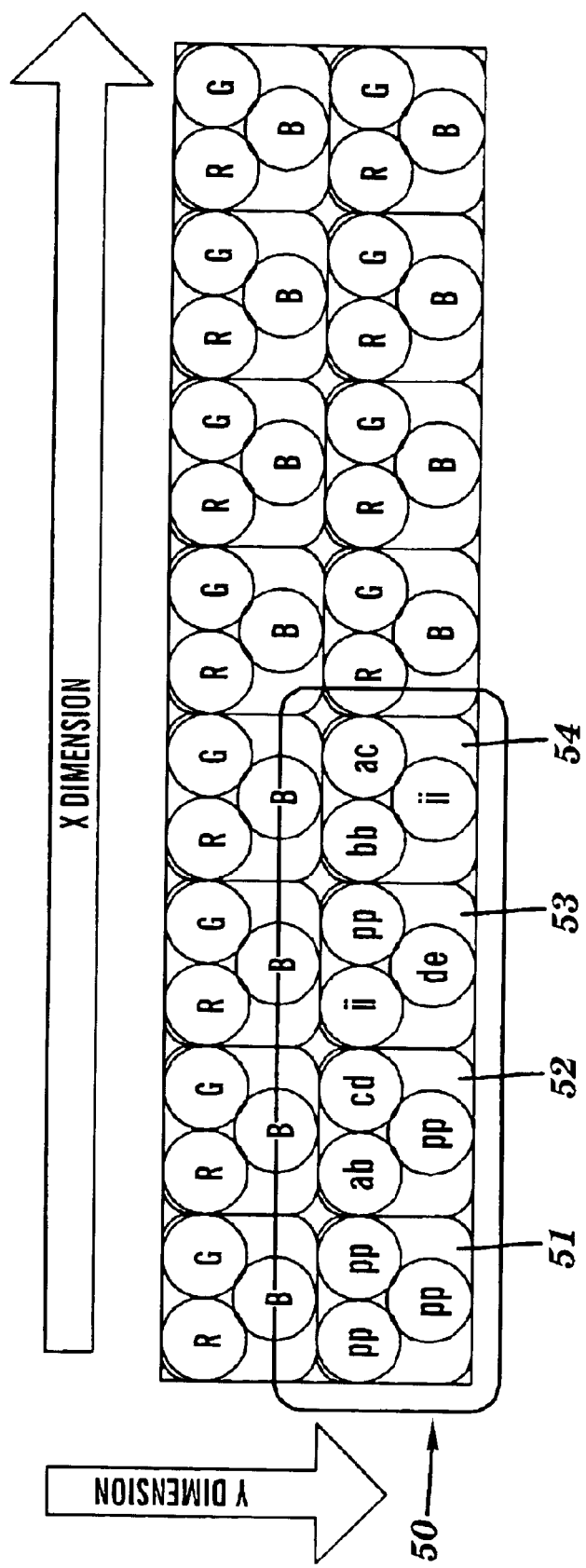
FIG. 7 depicts a pixel row of the source pixel data of FIG. 1 or FIG. 4 in a Hue Intensity Bit Pattern representation, in accordance with embodiments of the present invention.

FIG. 7 depicts a pixel row 50 of source pixel data 10 (see FIG. 1) in a Hue Intensity Bit Pattern representation, in accordance with embodiments of the present invention. In FIG. 7, color hues are shown for pixels 51–54 in the pixel row 50. The pixel 51 has the sequence "pppppp" of Hue Intensity Bit Patterns corresponding to 11111111 11111111 11111111 in binary notation. The pixel 52 has the sequence "abcdpp" of Hue Intensity Bit Patterns corresponding to 00000001 00100011 11111111 in binary notation. The pixel 53 has the sequence "iippde" of Hue Intensity Bit Patterns corresponding to 10001000 11111111 00110100 in binary notation. The pixel 54 has the sequence "bbacii" of Hue Intensity Bit Patterns corresponding to 00010001 00000010 10001000 in binary notation. Thus the pixel row 50 has the sequence pppppabcdppiippdebbacii . . . of Hue Intensity Bit Patterns.

FIG. 8 depicts the pixel 52 of FIG. 7 represented in Hue Intensity Bit (HIB) format. The pixel 52 in FIG. 8 has 16 rows and 6 columns. The 16 rows denoted as "a", "b", "c", . . . , "p" respectively correspond to the Hue Intensity Bit Patterns "a", "b", "c", . . . , "p" of FIG. 6. The 6 columns denoted as 0, 1, 2, 3, 4, 5 denote bit positions for identifying the Hue Intensity Bit Patterns corresponding to the color components of red, green, and blue. Columns 0 and 1 correspond to two Hue Intensity Bit Patterns that identifies the color intensity of the color component red in the pixel 52. Columns 2 and 3 correspond to two Hue Intensity Bit Patterns that identifies the color intensity of the color component green in the pixel 52. Columns 4 and 5 correspond to two Hue Intensity Bit Patterns that identifies the color intensity of the color component blue in the pixel 52. Each column and row of FIG. 8 intersect in a "cell" such as the cell 44 located at the intersection of the column 2 with the row "i". The pixel 52 includes 96 such cells (i.e., 6×16). The symbol "1" appears in a cell to denote the existence of a Hue Intensity Bit Pattern Noting from FIG. 7 that the pixel 52 has the sequence "abcdpp" of Hue Intensity Bit Patterns, FIG. 8 represents the "a" of "abcdpp" by insertion of "1" in the cell defined by the column 0 and the row "a". FIG. 8 represents the "b" of "abcdpp" by insertion of "1" in the cell defined by the column 1 and the row "b". FIG. 8 represents the "c" of "abcdpp" by insertion of "1" in the cell defined by the column 2 and the row "c". FIG. 8 represents the "d" of "abcdpp" by insertion of "1" in the cell defined by the column 3 and the row "d". FIG. 8 represents the first "p" of "abcdpp" by insertion of "1" in the cell defined by the column 4 and the row "p". FIG. 8 represents the second "p" of "abcdpp" by insertion of "1" in the cell defined by the column 5 and the row "p". All other cells of the pixel 52 in FIG. 8 are left blank and are understood to contain the number "0". Thus each cell of the pixel 52 in FIG. 8 contains a binary bit having a value of either "0" or "1". Each column contains exactly one "1" bit and fifteen "0" bits, and the pixel 52 in FIG. 8 contains exactly six "1" bits and ninety "0" bits. The sparsity of "1" bits in a pixel contributes to the ability of the present invention to achieve a compression reduction of greater than 90%.

Figure 9:
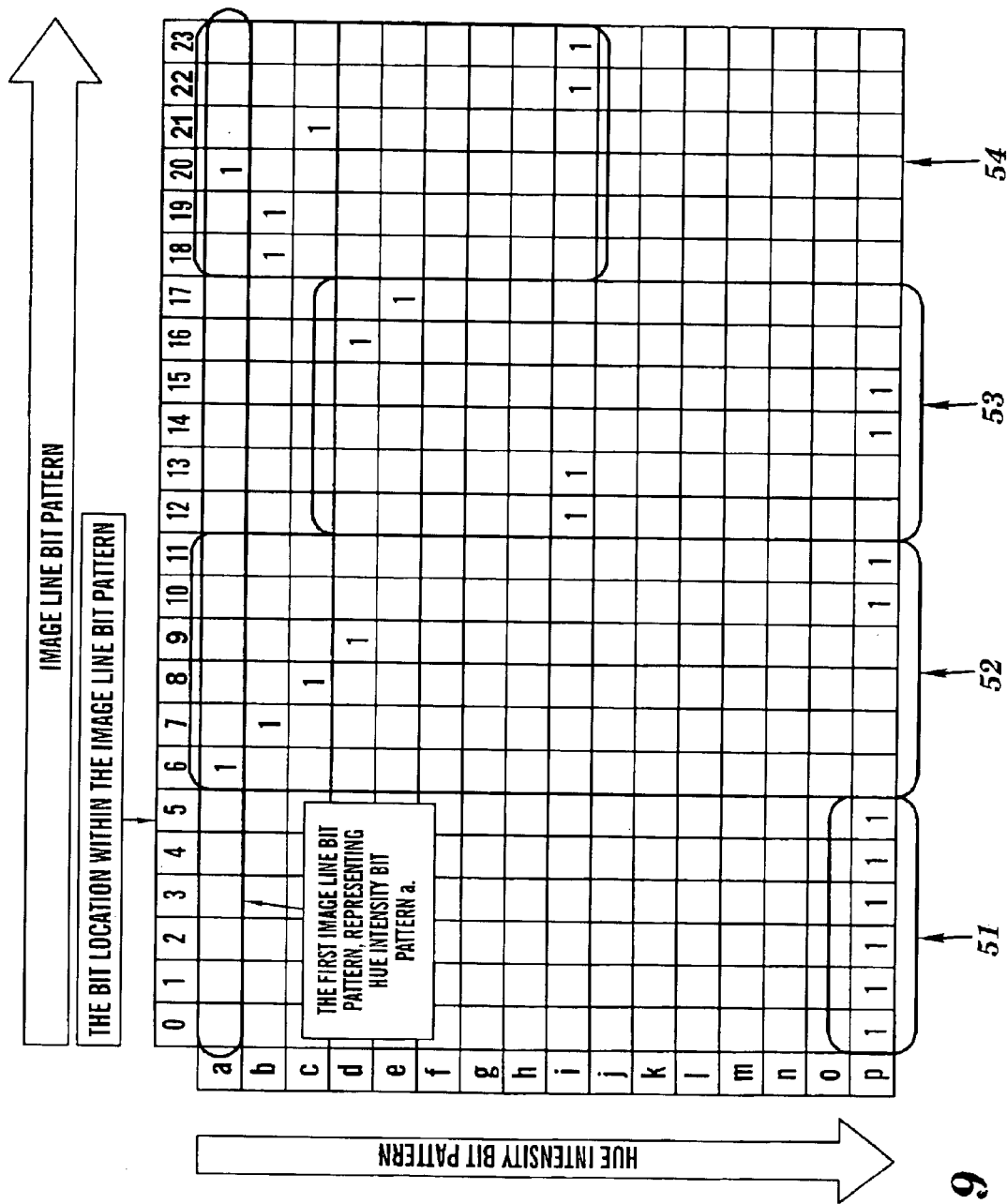
FIG. 9 represents a pixel row of FIG. 7 as Image Line Bit Patterns, in accordance with embodiments of the present invention.

FIG. 9 depicts a portion of the pixel row 50 of FIG. 7, wherein said portion of the pixel row 50 includes the pixels 51–54. Each of pixels 51–54 is expressed in the HIB format that was illustrated in FIG. 8 and discussed supra. With the HIB format, the pixel row 50 is expressed in FIG. 9 as 16 (i.e., $2^4$) Image Line Bit Patterns, denoted as "a", "b", "c", . . . , "p". Generally, each pixel row may be transformed into $2^P$ Image Line Bit Patterns, wherein P is the number of bits in each Hue Intensity Bit Pattern. The 16 Hue Intensity Bit Patterns shown in FIG. 9 each include all pixels in a given row, even though only pixels 51–54 are shown in FIG. 9. Each Image Line Bit Pattern of FIG. 9 is associated with a Hue Intensity Bit Pattern of FIG. 6 (i.e., "a", "b", "c", . . . , "p") as indicated in FIG. 9. For example, the Image Line Bit Pattern preceded by "c" in FIG. 9 is associated with the Hue Intensity Bit Pattern "c" (i.e., "0010") shown in FIG. 6. As explained supra in conjunction with FIG. 8, each cell in FIG. 9 contains "0" or "1", but "0" is omitted for simplicity. Thus the cells in FIG. 9 show only "1" wherever "1" exists. The symbol "1" in a cell represents the existence of the associated Hue Intensity Bit Pattern. For example, the "1" in the cell defined by the column 17 (in cell 53) and the row "e" denotes the Hue Intensity Bit Pattern "e".

Frame Decompostion analyzes each pixel row against the Hue Intensity Bit Patterns of FIG. 6 individually in a sequence (e.g., a left-to-right sequence). Since the number of Hue Intensity Bit Patterns in FIG. 6 remains constant for the image data being decomposed, the actual value (i.e., P bits) of the Hue Intensity Bit Pattern does not have to be captured during Frame Decompostion. Rather, the occurrence of the Hue Intensity Bit Pattern (denoted as "1" in a cell) is captured as the pixel color components are analyzed sequentially along the pixel row. Frame Decompostion determines the occurrence of a Hue Intensity Bit Pattern within a pixel row as a True (or 1) value within a series of bits that have the default value of False (or 0.) This series of "1" bits in an Image Line Bit Pattern represents the incidence of a Hue Intensity Bit Pattern in the cell in which the "1" appears.

The technique of identifying instances of Hue Intensity Bit Pattern occurrences along each pixel row allows the present invention to create a sequential set of Image Line Bit Patterns that can be individually compressed independent of any other information. It also allows the present invention to discard zero (i.e., "0") values of color components, since that a zero value is the default value upon which the Hue Intensity Bit Patterns are superimposed. This is of particular importance for digital motion pictures, where the instance of no pixel change between frames equates to a zero value for each color component of the pixel which did not change. The ability to discard the zero value pixel information increases the probability of achieving an optimal compression ratio.

Although each pixel row may be transformed into $2^P$ Image Line Bit Patterns, wherein P is the number of bits in each Hue Intensity Bit Pattern, the Image Line Bit Pattern in which no bit is set to "1" includes no useful information and may thus be discarded. For example, the Image Line Bit Pattern preceded by "a" in FIG. 9 may be discarded, since "a" does not include "1" as shown in FIG. 6. Thus, each pixel row may be represented by $2^P-1$ Image Line Bit Patterns (i.e., 15 Image Line Bit Patterns in the example of FIG. 9), which advantageously reduces the number of Image Line Bit Patterns by 6.25% (i.e., $\frac{1}{16}$).

The present invention leverages the fact that the relationship between the Image Line Bit Pattern and the Hue Intensity Bit Patterns limits the 1's that may appear in the $2^P-1$ Image Line Bit Patterns of a pixel row. In particular, once a bit of the Image Line Bit Pattern of a given pixel row is set to 1 (i.e., True), no other Image Line Bit Pattern may contain a 1 in that horizontal (X) bit location for the given pixel row. Therefore, the vast majority of bit values utilized in the aggregate Image Line Bit Patterns are equal to zero. The maximum percentage of 1 values in the given row may be calculated as $(1/(2^P-1)) \times 100$ for any image with $2^P-1$ possible Hue Intensity Bit Patterns. For example, if P=4 (so that $2^P-1=15$) then the maximum percentage of 1 values in the given row is $(\frac{1}{15}) \times 100$, or 6.67%. Since this percentage remains constant throughout the representation of the image, the numeric representation of the image will comprise 93.33% zero's if P=4.

The number of Image Line Bit Patterns required to represent the digital image data is calculated as $N_Y N_H$, wherein $N_Y$=number of pixel rows, and $N_H$=number of distinct Hue Intensity Bit Patterns (i.e., $2^P-1$) being utilized to create the Image Line Bit Patterns. The number of bits required to represent digital image data in each pixel row is $N_X N_C B/P$, wherein $N_X$=number of pixels in each pixel row, $N_C$=number of color components, B=number of bits that describes the color intensity of each color component, and P=number of bits in each Hue Intensity Bit Pattern. The average number of 1 bits in each Image Line Bit Pattern=the number of bits in each Image Line Bit Pattern/$(2^P-1)$, or $[N_X N_C B/P]/[2^P-1]$. In the example of FIG. 9 with 640×480 pixel configuration, $N_Y$=480, $N_X$=640, $N_C$=3, B=8, P=4, and $N_H=2^P-1=15$, so that: the number of Image Line Bit Patterns is 7200 (i.e., 480×15); the number of bits required to represent digital image data in each pixel row is 3840 bits (i.e., 640×3×8/4); and the average number of 1 bits in each Image Line Bit Pattern is 256. (i.e., is $3840/15$).

The value of the Image Line Bit Pattern is the only variable remaining as a result of Frame Decompostion and the actual value of the Inage Line Bit Pattern may be decoupled from the process. This decoupling provides the opportunity to apply compression techniques independent of any other data.

Frame Decompostion may create Image Line Bit Patterns by scanning each pixel row of the digital image in any order such as from top to bottom of the digital image, from bottom to top of the digital image, etc. Each pixel row is scanned in any order such as from left to right, from right to left, etc. The color intensities of each color component of each pixel are each compared with the Hue Intensity Bit Patterns (e.g., see FIG. 6) in order to express each pixel in HIB format in order to generate the $2^P-1$ Image Line Bit Patterns for each pixel row. The color components may be analyzed in any order such as, inter alia, starting with as red, followed by green, and followed by blue.

Figure 10:
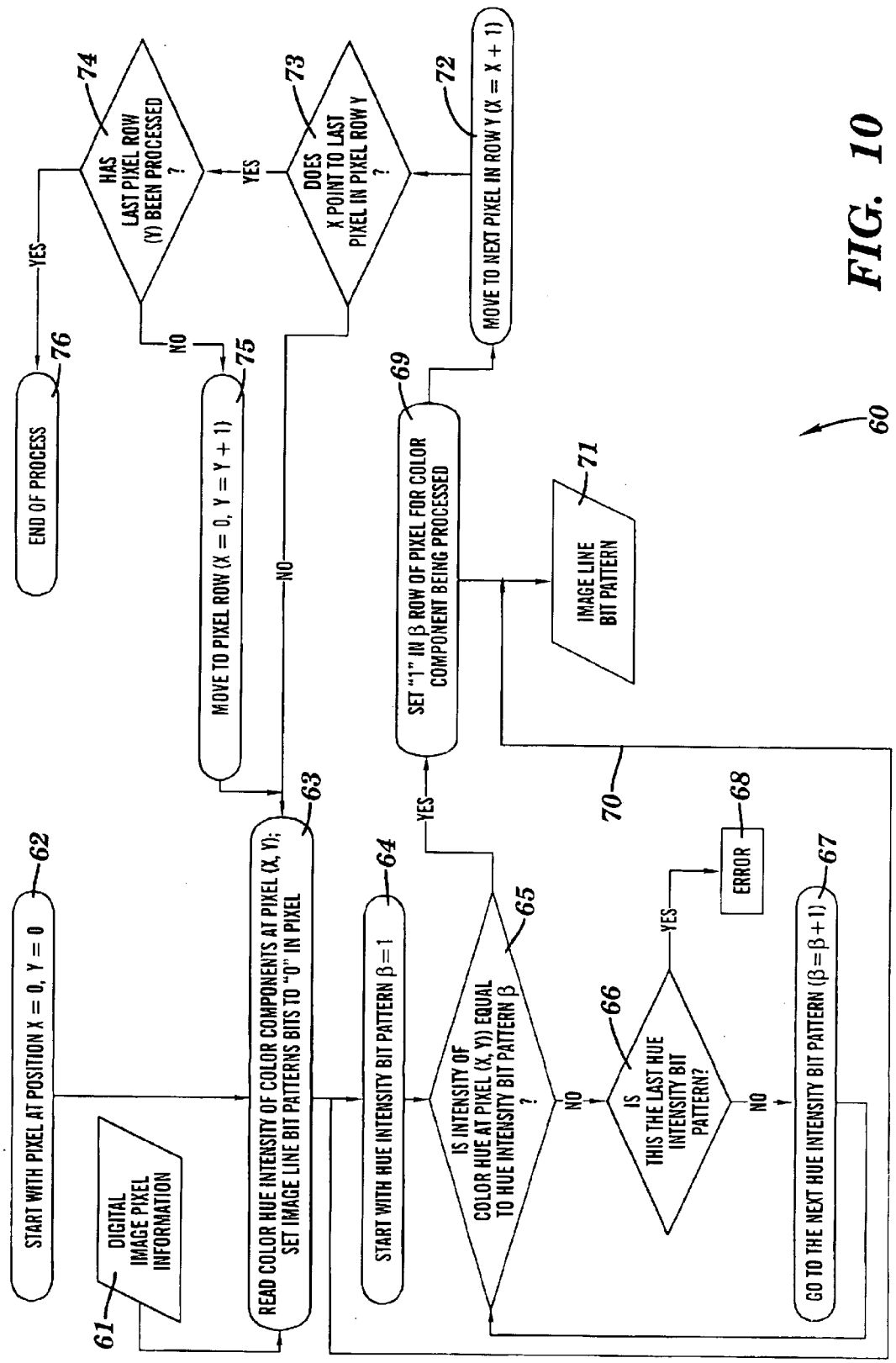
FIG. 10 is a flow chart of a process that implements Frame Decomposition, in accordance with embodiments of the present invention.

FIG. 10 is a flow chart 60 of a process that implements Frame Decompostion. In FIG. 10, the process begins at step 62 and ends at step 76. Input to the process includes digital image pixel information 61, and output from the process includes Image Line Bit Patterns 71. The digital image pixel information 61 is derived from the digital image associated with the digital image source 10 of FIG. 1.

In FIG. 10, the process begins at step 62 at which the pixel indexes x and y are each initialized to zero. Index x points in the direction 4 associated with the X-direction in FIG. 4 such that x=0 is associated with the pixel column 41 in FIG. 4 (i.e., x increases in the sequence 0, 1, 2, ... in the direction 4). Alternatively, x could be defined to increase in the direction opposite to the direction 4 such that x=0 would be associated with the pixel column 42 in FIG. 4. Index y points in the direction 5 associated with the Y-direction in FIG. 4 such that y=0 is associated with the pixel row 47 in FIG. 4 (i.e., y increases in the sequence 0, 1, 2, ... in the direction 5). Alternatively, y could be defined to increase in the direction opposite to the direction 5 such that y=0 would be associated with the pixel row 48 in FIG. 4.

Step 63 reads the color hues of color components at the pixel (x,y). The color components may comprise, inter alia, red, green, and blue. If each color hue is described in 8 bits, then the color hue is in the range 0 to 255. Step 63 also sets the Image Line Bit Pattern bits equal to "0" in the pixel defined by pixel indexes x and y.

Steps 64–69 collectively pertain to each one of the color components at the pixel (x,y). Accordingly, the following discussion of steps 64–69 pertains a given color component of the color components at the pixel (x,y). Thus, there is an outer loop 70 around steps 64–69, wherein the outer loop 70 defines looping over the color components at the pixel (x,y); i.e., the first iteration of the outer loop 70 is for the first color component (e.g., red), the second iteration of the outer loop 70 is for the second color component (e.g., green), etc. As such, the step 72 in FIG. 10 is not executed until all color components at the pixel (x,y) have been looped over via the outer loop 70.

As described supra, the color hue of the given color component may be represented by an integral number of Hue Intensity Bit Patterns. As an example, an 8-bit color hue may be a sequence of two of the 4-bit Hue Intensity Bit Patterns "a", "b", "c", ..., "p" in FIG. 4. Thus steps 64–69 in FIG. 10 include comparing each color hue at the pixel (x,y) with the fixed list of Hue Intensity Bit Patterns such as "a", "b", "c", ..., "p" in FIG. 4. The symbol β is defined herein as an index having values 1, 2, ..., 16 respectively corresponding the Hue Intensity Bit Pattern "a", "b", "c", ..., "p". Thus β=1 corresponds to "a", β=2 corresponds to "b", etc.

Step 64 in FIG. 10 initializes β to 1 (i.e., the Hue Intensity Bit Pattern "a" for the example of FIG. 4). Step 65 determines whether the color hue at pixel (x,y) is equal to the Hue Intensity Bit Pattern β. If "No" then the process loops through the Hue Intensity Bit Patterns (via steps 66–69) which increments β by 1 in each such looping until the answer to the query in step 65 is "Yes". The answer of "Yes" is obtained for the color hue being processed if the entire color hue has been matched to Hue Intensity Bit Patterns. The answer of "Yes" causes a "1" to be set in the β row within the pixel (x,y) (i.e., in the β row corresponding to the matched Hue Intensity Bit Pattern) for the color component being processed. Then the Image Line Bit Pattern 71 is updated for the pixel (x,y). The processing of all pixels of the pixel row y results in the entire Image Line Bit Pattern 71 being formed. Note that an answer of "Yes" to the query of step 66 means that a color hue bit sequence cannot be matched to a Hue Intensity Bit Pattern and therefore denotes an error 68, which is probably a programming error, hardware error, etc. since the error 68 cannot logically occur based on the invention disclosed herein.

After the processing of the pixel (x,y) has been completed (i.e., step 69 has been executed by the outer loop 70 for all color components), then the next pixel is established in step 72 via x=x+1. Step 73 determines whether x points to the last pixel to be processed in the pixel row y. If "No" then pixel (x,y) is again processed for the next pixel in pixel row y beginning with step 63. If "Yes" and y is not the last row, then y is incremented by 1 in step 75 (and x is set to zero) to initiate processing of the next row, and step 63 is reentered to process the first pixel (x=0) in the next pixel row. If "Yes" and y is the last row, then the process ends as shown in step 76.

In the foregoing manner, all such Image Line Bit Patterns 71 are generated such that all pixel rows of the digital image pixel information 61 have been processed.

The data transmitted from digital image source 10 to the digital image receiver 40 (see FIG. 1) is of two types: Constant Digital Image Data and Compressed Pixel data. The Constant Digital Image Data (and a representative number of bits used for storage) includes:

1) the number of color components (4 bits);
2) the number of bits P in each Hue Intensity Bit Pattern (4 bits);
3) the number of bits B that describes the color intensity of a color component (8 bits), or equivalently, the number B/P of Hue Intensity Bit Patterns per color component (4 bits); and
4) the image dimensions in pixels; e.g., 640 pixels horizontal (X) and 480 pixels vertical (Y) (20 bits).

The preceding representative number of bits is for illustrative purposes only and is not intended to limit the invention. Thus the Constant Digital Image Data may include, inter alia, a total of 36 or 32 bits.

The Compressed Pixel Data includes the Image Line Bit Patterns in compressed form, as determined by Image Line Encoding.

Image Line Encoding

Figure 11:
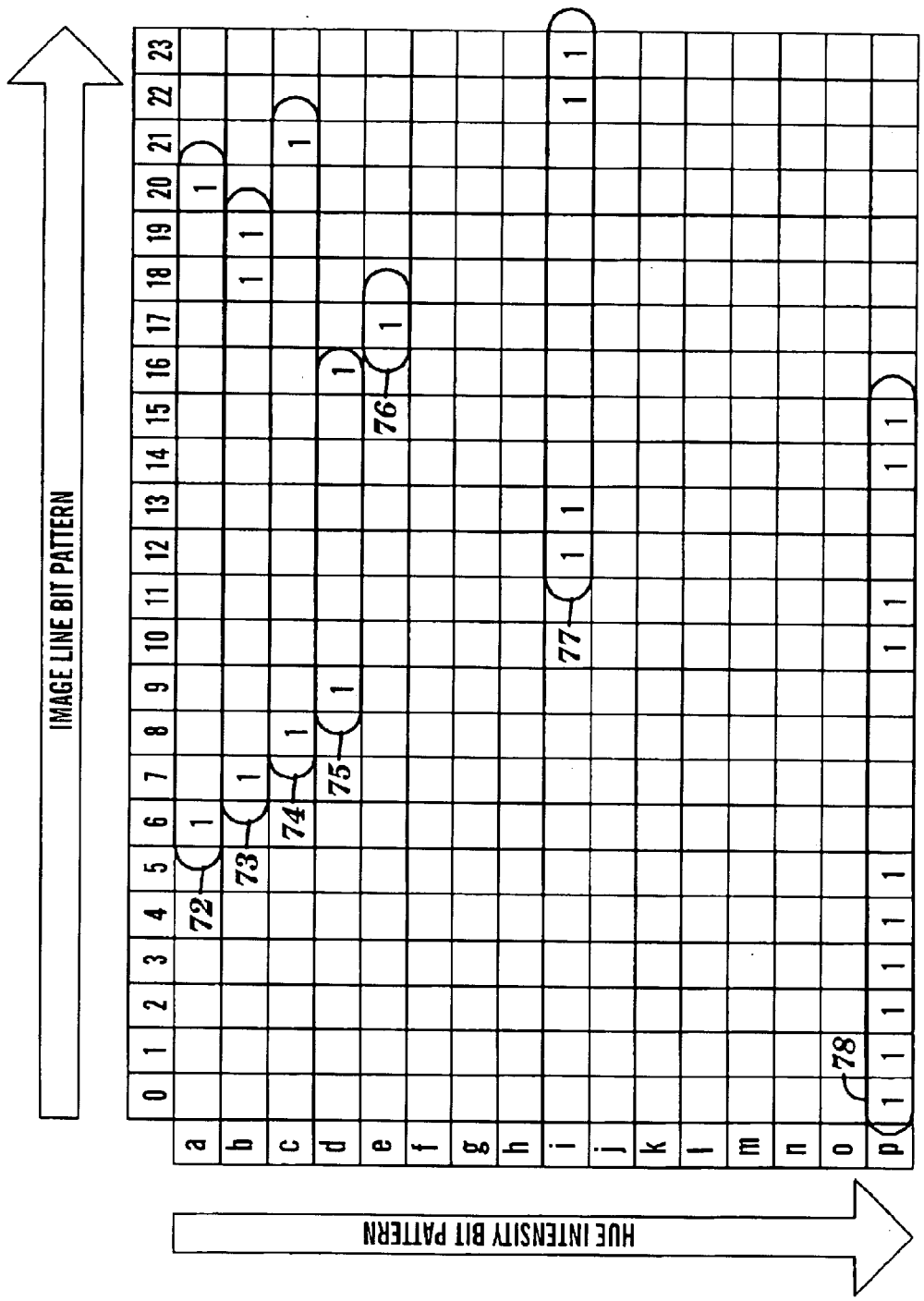
FIG. 11 depicts FIG. 9 with the 1's in each Image Line Bit Pattern isolated and identified as bit segments, in accordance with embodiments of the present invention.

Image Line Encoding interprets each Image Line Bit Pattern independently and generates a collection of bits, called a "Bit Mask Indicator," that represents the Image Line Bit Pattern in a compressed form. Generating the Bit Mask Indicator includes identification of a standardized pattern of bits in each Image Line Bit Pattern and categorizing such patterns. As an aid to identifying a standardized pattern of bits in the Image Line Bit Pattern, the 1's in each Image Line Bit Pattern may be isolated as shown in FIG. 11. The isolated 1's in FIG. 11 are derived from FIG. 9 and are identified as bit segments 72–78.

Figure 12A:
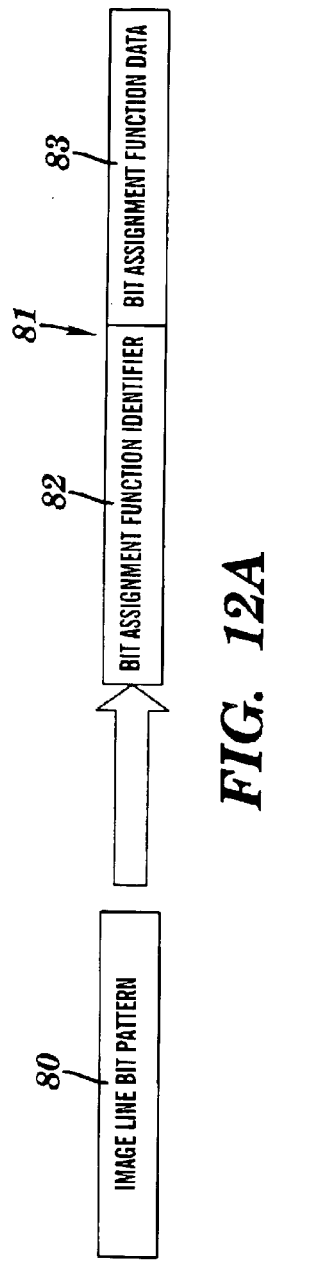
FIGS. 12A, 12B, and 12C depict representation of an Image Line Bit Pattern as a Bit Mask Indicator having a Bit Assignment Function Identifier component and a Bit assignment Function Data component, in accordance with embodiments of the present invention.
Figure 12B:
Figure 12C:
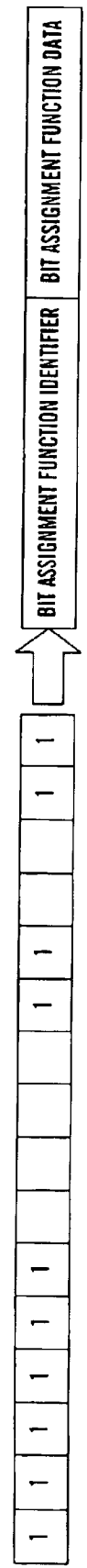

The Bit Mask Indicator has a structure depicted in FIG. 12A. In FIG. 12A, an Image Line Pattern 80 is compressed into a Bit Mask Indicator 81. The Bit Mask Indicator 81 has two components, namely a Bit Assignment Function Identifier 82 and Bit assignment Function Data 83. The Bit Assignment Function Identifier 82 has a fixed length (4 bits in the examples that follow). The Bit Assignment Function Data 83 has a variable length, as will be illustrated infra. FIGS. 12B and 12C further illustrate that the bit segments 77 and 78 of FIG. 11 may each be represented as a Bit Mask Indicator having a Bit Assignment Function Identifier component and a Bit assignment Function Data component.

The present invention permits a variety of compression techniques to be applied independently to the Image Line Bit Patterns. The Bit Assignment Function Identifier identifies the compression technique being used for a given Image Line Bit Pattern. Thus, the Bit Assignment Function Identifier specifies the means by which the Image Line Bit Pattern is to be recreated in the subsequent Image Line Decoding. The Bit Assignment Function Data includes the data required to recreate the Image Line Bit Pattern in the subsequent Image Line Decoding. The Bit Assignment Function Identifier has a fixed size (i.e., a fixed length or fixed number of bits). The Bit Assignment Function Data has a variable size (i.e., variable length or variable number of bits), from 0 bits (i.e., no data) to the number of bits encompassed by the Image Line Bit Pattern (where the Image Line Bit Pattern itself is sent as an uncompressed value). Although the Bit Assignment Function Data varies in size, the size of the Bit Assignment Function Data is interpreted from the Constant Digital Image Data (described supra) and the Bit Assignment Function Identifier. Therefore, the Bit Assignment Function Identifier specifies the compression mechanism being employed upon the Bit Assignment Function Data.

The Bit Assignment Function Identifier identifies a compression technique called a Bit Assignment Function. The present invention is open to evolving Bit Assignment Functions which contribute to continual optimization for representing the Image Line Bit Patterns in the most efficient manner, as well as for providing the ability to utilize external compression mechanisms for representing the Image Line Bit Patterns. The number of bits occupied by the Bit Assignment Function Identifier must be large enough to include all possible Bit Assignment Functions being utilized. For illustrative purposes only without limiting the invention, the following discussion uses 4 bits for the Bit Assignment Function Identifier.

The present invention comprises the following Bit Assignment Functions:

1. Default
2. Global 0's
3. Global 1's
4. External
5. Repeating
6. Recurring
7. Algorithmic FIGS. 13, 14, 15, 16, 17A, 17B, 18A, 18B, and 19 illustrate the preceding Bit Assignment Functions such that a bit is represented as "1" (i.e., True) or as blank which is understood to mean "0" (i.e., False). Although these Figures represent the Bit Assignment Function Identifier in 4 bits, the Bit Assignment Function Identifier may be represented in any desired number of bits.

Figure 13:
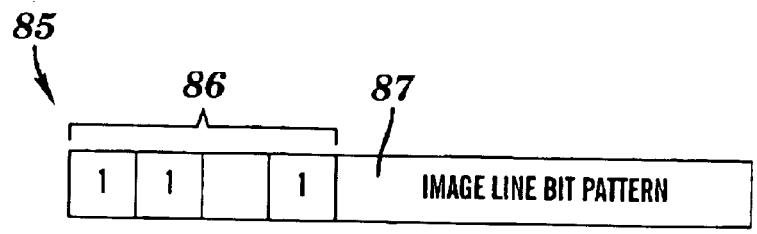
FIG. 13 illustrates the "Default" Bit Assignment Function, in accordance with embodiments of the present invention.

FIG. 13 illustrates the "Default" Bit Assignment Function, which is used if no other Bit Assignment Function is capable of representing the Image Line Bit Pattern. The "Default" Bit Mask Indicator 85 includes a Bit Assignment Function Identifier 86 of "1101" and a Bit Assignment Function Data value of the Image Line Bit Pattern 87. Thus, the "Default" Bit Mask Indicator, which is expected to be infrequently used, does not include a compressed form of the Image Line Bit Pattern. If the X dimension has 640 pixels, then the "Default" Bit Mask Indicator has 3844 bits, since a pixel row of 640 pixels has 3840 bits as explained supra.

Figure 14:
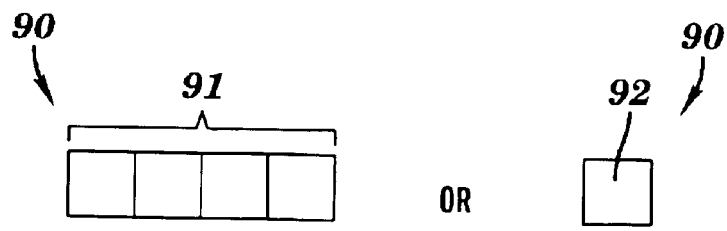
FIG. 14 illustrates the "Global 0's" Bit Assignment Function, in accordance with embodiments of the present invention.

FIG. 14 illustrates the "Global 0's" Bit Assignment Function, which denotes that all bits in the Image Line Bit Pattern are set to 0. The "Global 0's" Bit Mask Indicator 90 includes a Bit Assignment Function Identifier 91 of "0000" (4 bits) and no Bit Assignment Function Data value. Thus, with "0000" for the Bit Assignment Function Identifier 91, the Bit Mask Indicator 90 includes a total of 4 bits. Alternatively, the Bit Mask Indicator 90 could include a Bit Assignment Function Identifier 92 of "0" (1 bit) if all other Bit Assignment Function Identifiers are assumed to include a leftmost bit of "1", which would make "0" a unique identifier of the "Global 0's" Bit Identifier Function. Thus, with "0" for the Bit Assignment Function Identifier 92, the Bit Mask Indicator 90 includes a total of 1 bit.

Figure 15:
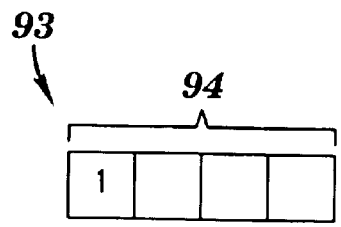
FIG. 15 illustrates the "Global 1's" Bit Assignment Function, in accordance with embodiments of the present invention.

FIG. 15 illustrates the "Global 1's" Bit Assignment Function, which denotes that all bits in the Image Line Bit Pattern are set to 1, which occurs when solid colors of equal color component values (or gray scale values) span the horizontal width of the digital image at the pixel row that includes the Image Line Bit Pattern. The "Global 1's" Bit Mask Indicator 93 includes a Bit Assignment Function Identifier 94 of "1000" and no Bit Assignment Function Data value. Thus, the Bit Mask Indicator 93 includes a total of 4 bits.

Figure 16:
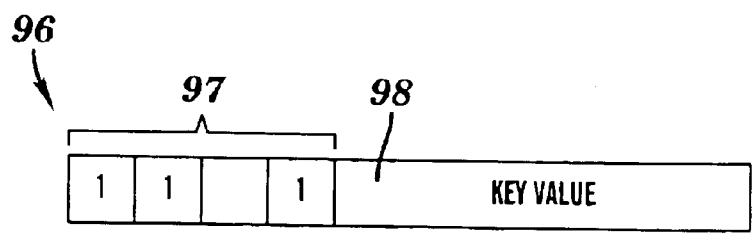
FIG. 16 illustrates the "External" Bit Assignment Function, in accordance with embodiments of the present invention.

FIG. 16 illustrates the "External" Bit Assignment Function, which denotes that the Image Line Bit Pattern is passed to an external mechanism for compression. The Bit Assignment Function Data value depends on a "Key Value" that the external mechanism utilizes for encoding and decoding the Image Line Bit Pattern. Thus, the form of the Key Value (e.g., an integer, a character, a string, etc.) is determined by the external mechanism. The "External" Bit Mask Indicator 96 includes a Bit Assignment Function Identifier 97 of "1100" and a Bit Assignment Function Data value of the Key Value 98. The external mechanism may include, inter alia, a database. For example, the database may include stored Image Line Bit Patterns such that the Key Values are pointers to the Image Line Bit Patterns that are stored in the database. The external mechanism may include, inter alia, an algorithm. For example, the algorithm may generate specific Image Line Bit Patterns such that the Key Values identify the specific Image Line Bit Patterns. Image Line Encoding passes the Image Line Bit Pattern to the external mechanism, and the external mechanism returns the Key Value that is associated with the Image Line Bit Pattern.

FIG. 17A illustrates the "Repeating" Bit Assignment Function, which denotes a constant pattern of bits within the Image Line Bit Pattern, wherein the constant pattern of bits may repeat within the Image Line Bit Pattern. The "Repeating" Bit Mask Indicator includes a Bit Assignment Function Identifier 100 of "1010" and Bit Assignment Function Data 101 that indicates: the bit location 102 where the repeatable pattern begins within the Image Line Bit Pattern 106, the length 103 of the repeatable pattern 105, the number of occurrences 104 of the repeatable pattern 105, and the repeatable pattern 105. Note that the number of occurrences 104 is at least 1, and the case of exactly 1 occurrence is characterized by no repetitions of the repeatable pattern 105 within the Image Line Bit Pattern. For illustrative purposes, the Image Line Bit Pattern 106 in FIG. 17A is a copy of Image Line Bit Pattern "i" shown in FIG. 11. In FIG. 17A, the Image Line Bit Pattern 106 includes the repeatable pattern 105. The bit location 102 has the value 13 in this example, which denotes that the repeatable pattern 105 begins at bit 13 of the Image Line Bit Pattern 106. The length 103 of the repeatable pattern 105 has the value 10 in this example, which denotes that the repeatable pattern 105 has a length of 10 bits. The number of occurrences 104 of the repeatable pattern 105 has the value 2 in this example, which denotes that the repeatable pattern 105 occurs twice in the Image Line Bit Pattern 106. In the example in FIG. 17A, the bit location 102 has a constant length of 12 bits, the length 103 has a constant length of 8 bits, the number of occurrences 104 has a constant length of 8 bits, and the repeatable pattern 105 has a variable length of 10 bits. Alternatively, the repeatable pattern 105 could have a constant length of a maximum allowed number of bits (e.g., 32 bits) such that only the leftmost (or rightmost) bits denoted by length 103 are significant. A variable length, however, for representing the repeatable pattern 105 minimizes the length of the Bit Mask Indicator. In the example of FIG. 17A, the Bit Assignment Function Data 101 has a length of $(28+L_P)$ bits (i.e., $12+8+8+L_P$), wherein $L_P$ is the number of bits of the repeatable pattern 105 (10 bits in the example in FIG. 17A). After adding the 4 bits of the Bit Assignment Function Identifier 100 to the $(28+L_P)$ bits of the Bit Assignment Function Data 101, the Bit Mask Indicator is seen to have a length of $(32+L_P)$ bits or 42 bits in the example of FIG. 17A.

FIG. 17B shows the Bit Mask Indicator 108 for the example in FIG. 17A. In FIG. 17B, the Bit Mask Indicator 108 is shown as a concatenation of the Bit Assignment Function Identifier 100, the bit location 102, the length 103, the number of occurrences 104, and the repeatable pattern 105.

Figure 18A:
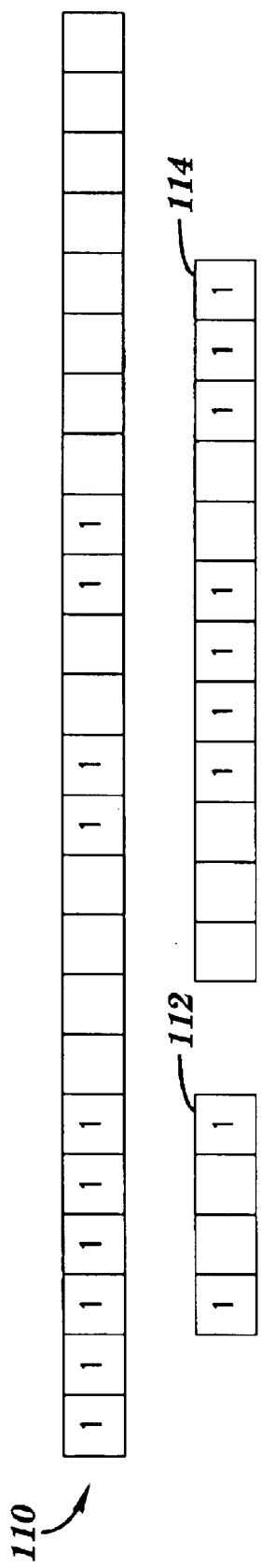
FIG. 18A illustrates the "Recurring" Bit Assignment Function, in accordance with embodiments of the present invention.

FIG. 18A illustrates the "Recurring" Bit Assignment Function, which indicates that the Image Line Bit Pattern 110 appeared previously as an Image Line Bit Pattern in the digital image data. Therefore, the Image Line Bit Pattern 110 may be located by referencing the previous appearance. The "Recurring" Bit Mask Indicator includes a Bit Assignment Function Identifier 112 of "1001" and a Bit Assignment Function Data 114 that serves as an index (i.e., 487) to the previous appearance of the same Image Line Bit Pattern. For illustrative purposes, the Image Line Bit Pattern 110 in FIG. 18A is a copy of Image Line Bit Pattern "p" shown in FIG. 11. In the example of FIG. 18A, the Bit Assignment Function Data 114 has a length of 12 bits. After adding the 4 bits of the Bit Assignment Function Identifier 112 to the 12 bits of the Bit Assignment Function Data 114, the Bit Mask Indicator is seen to have a length of 16 bits in the example of FIG. 18A.

Figure 18B:
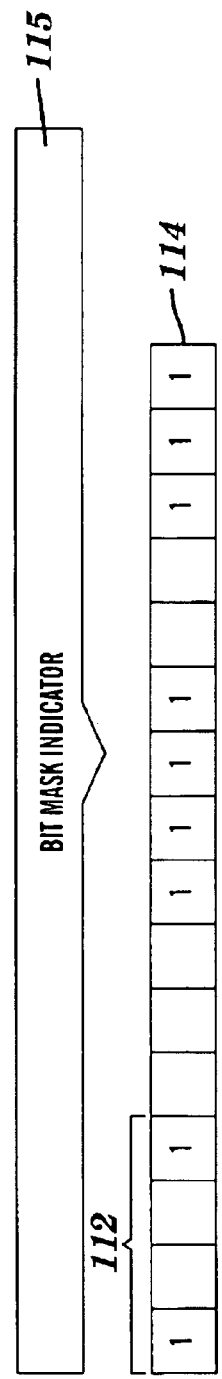
FIG. 18B shows the Bit Mask Indicator associated with the Bit Assignment Function of FIG. 18A, wherein the Bit Mask Indicator is shown as a concatenation of the Bit Assignment Function Identifier and the Bit Assignment Function Data, in accordance with embodiments of the present invention.

FIG. 18B shows the Bit Mask Indicator 115 for the example in FIG. 18A. In FIG. 18B, the Bit Mask Indicator 115 is shown as a concatenation of the Bit Assignment Function Identifier 112 and the Bit Assignment Function Data 114.

Figure 19:
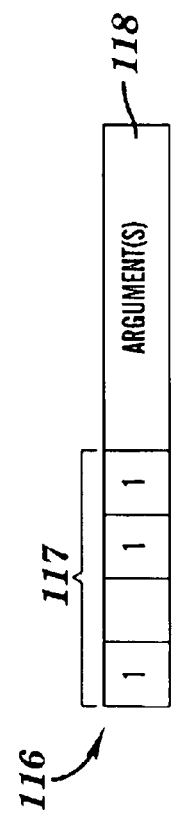
FIG. 19 illustrates the "Algorithmic" Bit Assignment Function, in accordance with embodiments of the present invention.

FIG. 19 illustrates the "Algorithmic" Bit Assignment Function for which a compression algorithm is applied to the Image Line Bit Pattern. The "Algorithmic" Bit Mask Indicator 116 includes a Bit Assignment Function Identifier 117 of "1011" and a Bit Assignment Function Data value Argument(s) 118. The argument(s) include input to the compression algorithm and the nature of the argument(s) depending on how the compression algorithm works.

Transforming an Image Line Bit Pattern into a Bit Mask Indicator includes the use of any Bit Assignment Function. Although said transforming of the Image Line Bit Pattern typically compresses the Image Line Bit Pattern as described supra, some Image Line Bit Patterns may not be compressed. As an example, the "Default" Bit Assignment Function does not compress the Image Line Bit Pattern as explained supra in conjunction with FIG. 13.

Figure 20:
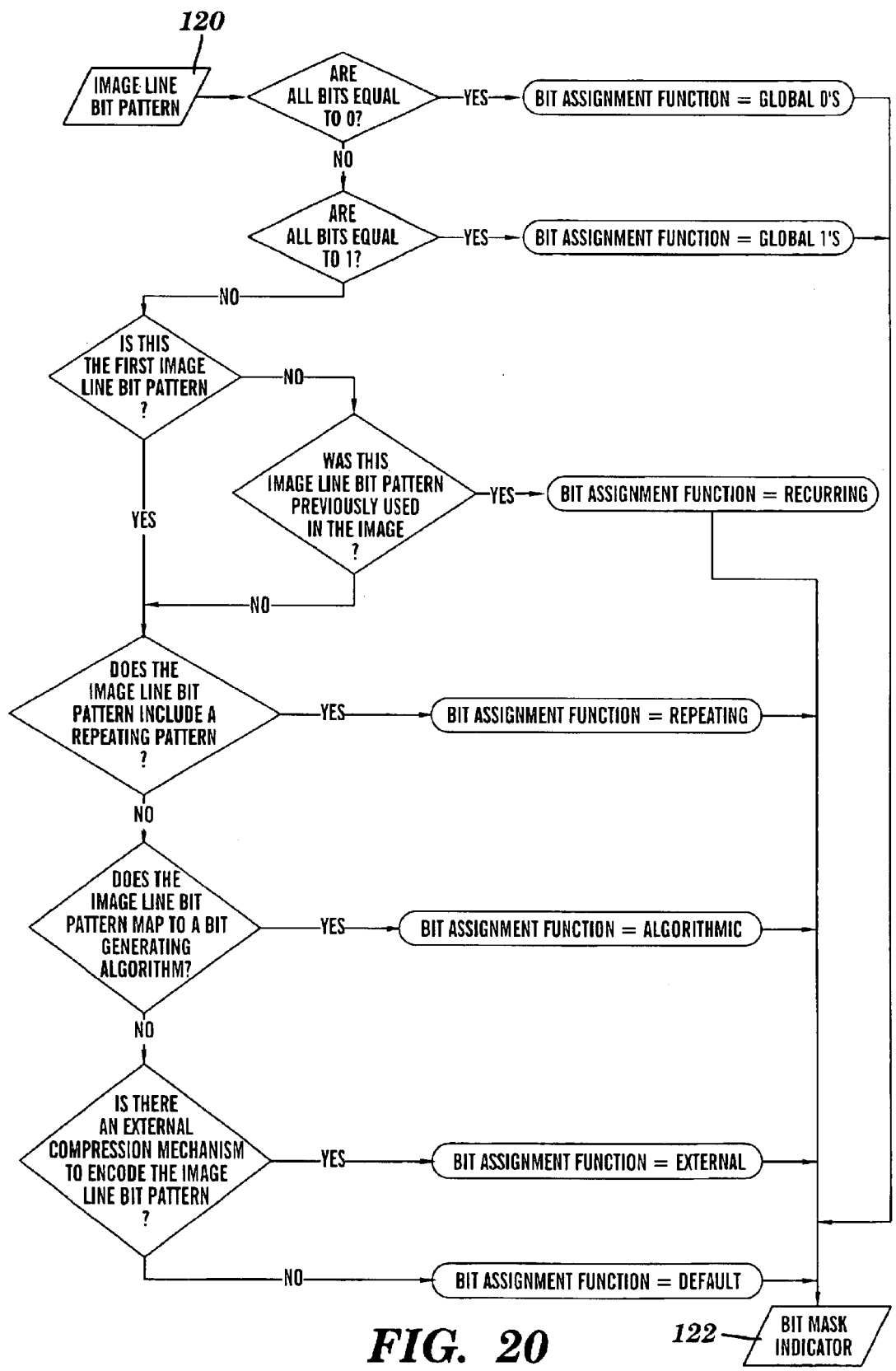
FIG. 20 is a flow chart for converting an Image Line Bit Pattern into a Bit Mask Indicator, in accordance with embodiments of the present invention.

FIG. 20 is a flow chart for converting an Image Line Bit Pattern 120 into a Bit Mask Indicator 122, in accordance with the Bit Assignment Functions that have been described supra.

Thus, an image may include a variety of Bit Mask Indicators, depending upon which is most efficient or useful for the Image Line Bit Pattern being encoded. Image Line Encoding assigns the appropriate value to the Bit Mask Indicator which includes the Bit Assignment Function Identifier. The Bit Assignment Function Identifier is a constant that is appended to the variable value (i.e., the Bit Assignment Function Data) that the Bit Assignment Function requires. Additionally, the "Default" Bit Mask Indicator is shown in FIG. 20 to be relevant only after all other possible Bit Mask Indicators have been rejected. In FIG. 20, the hierarchical order in which applicability of the various Bit Assignment Functions are tested for is illustrative and is not intended to limit the invention. While it makes sense to test for applicability of "Global 0's" and "Global 1's" before testing for applicability of the other Bit Assignment Functions (since "Global 0's" and "Global 1's" provide very efficient compression), the scope of the present invention includes testing for the applicability of the Bit Assignment Functions in any order based on any criteria (e.g., maximizing compression, minimizing computation time, a combination thereof, etc.).

The present invention reduces the digital image information to a single, variable data element that is the only data required to describe the digital image when processed in a sequential manner. This enables the present invention to efficiently represent the digital image in terms of numeric values, or bits, in a manner which remains open to evolving compression techniques. Thus some or all of the Bit Assignment Functions of FIG. 20 may be utilized and other Bit Assignment Functions may be added as they evolve. This creates the opportunity for substantial reduction from the original size of the digital image data. For example, as discussed supra, a 640 pixel×380 pixel image with 3 color components requires 921,600 bytes to represent the digital image data (i.e., 640 pixels×480 pixels×3 color components×8 bits/color component×1 byte/8 bits). If the same digital image is represented by Image Line Bit Patterns and associated Bit Mask Indicators each having 64 bits (i.e., 8 bytes) in length, then the number of bytes required to represent the digital image data is 57,600 bytes of Bit Mask Indicators+a negligible 36 or 32 bits of Constant Digital Image Data (see example supra for representative numbers of bits in the Constant Digital Image Data). The 57,600 bytes is computed as: 480 pixel rows×15 Bit Mask Indicators/row×8 bytes/Bit Mask Indicator. The compression factor ($C_F$) is defined herein as the number of bits (or bytes) of the original digital image/the number of bits (or bytes) of the compressed digital image. The compression percent ($C_P$) is defined herein as the percent reduction in bits (or bytes) in going from the original digital image to the compressed digital image. Mathematically, $C_P = 100 \times (1 - 1/C_F)$. Thus in the preceding example the digital image data has a compression factor of 16.00 (i.e., 921,600 bytes/57,604 bytes) and an associated compression percent of 93.75% (i.e., $100 \times (1 - 1/16)$).

The rate of compression increases as the size of the original digital image increases, since adding bits to the Bit Assignment Function Data increases at a lower rate than the increase in digital image data being compressed. For example, a 1600 pixel×1200 pixel with 3 color components requires 5,760,600 bytes to represent the digital image data (i.e., 1600 pixels×1200 pixels×3 color components×8 bits/color component×1 byte/8 bits). If the same digital image is represented by Image Line Bit Patterns and associated Bit Mask Indicators with each Bit Mask Indicator having 90 bits (i.e., 11.25 bytes) in length, then the number of bytes required to represent the digital image data is 202,500 bytes of Bit Mask Indicators+a negligible number of bits of Constant Digital Image Data The 202,500 bytes is computed as: 1200 pixel rows×15 Bit Mask Indicators/row×11.25 bytes/Bit Mask Indicator. Thus the digital image data has a compression factor of 28.44 (i.e., 5,760,000 bytes/202,505 bytes) and an associated compression percent of 96.48% (i.e., $100 \times (1 - 1/28.44)$). In general, the compression factor is proportional to $N_Y/\alpha$, wherein $N_Y$=number of pixel rows, and wherein α=average number of bits per Bit Mask Indicator. As seen from the preceding calculations, a compression percent exceeding 90% may be easily achieved with the present invention, and this compression percent exceeding 90% may be achieved with lossless compression.

Bit Stream Creation

Figure 21:
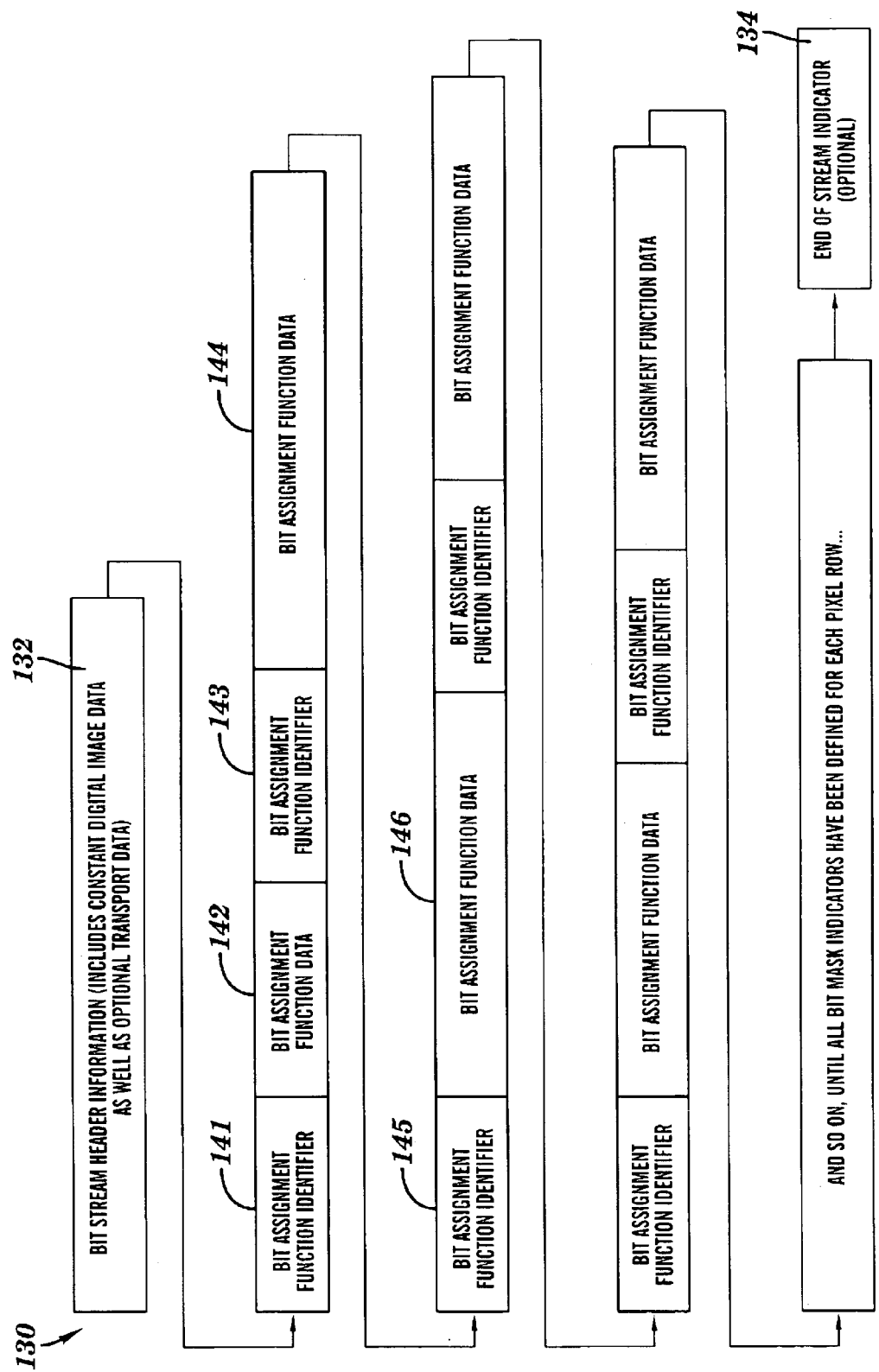
FIG. 21 depicts Bit Stream Creation, in accordance with embodiments of the present invention.

Once an assignment of Bit Mask Indicators have been made, the present invention assembles, via Bit Stream Creation, the actual bit stream utilized to store or transmit the digital image data. Bit Stream Creation aggregates the Bit Mask Indicators determined by Image Line Encoding and appends the Bit Mask Indicators to the Bit Stream Header Information 132 that includes Constant Digital Image Data, as shown in FIG. 21. The bit stream 130 in FIG. 21 comprises in sequence: the Bit Stream Header Information 132, the Bit Mask Indicators, and an optional End of Stream Indicator 134. The Bit Mask Indicators comprises in sequence: a first Bit Mask Indicator that includes a Bit Assignment Function Identifier 141 and Bit Assignment Function Data 142, second Bit Mask Indicator that includes a Bit Assignment Function Identifier 143 and Bit Assignment Function Data 144, a third Bit Mask Indicator that includes a Bit Assignment Function Identifier 145 and Bit Assignment Function Data 146, . . . , and so on until all Bit Mask Indicators have been defined for each pixel row. See also FIGS. 17B and 18B, described supra, for representations of the Bit Mask Indicator as a concatenation of the Bit Assignment Function Identifier and the Bit Assignment Function Data.

The bit stream 130 may be prefixed in the Bit Stream Header Information 132, and terminated, with values that aid in storage and transmission of the bit stream 130, depending upon the implementation of the present invention. For example, the implementation may include comments, check-sum values, beginning of file and end of file indicators and any other values which assist in writing, reading, transporting or storing the bit stream 130.

The bit stream 130 may be stored as a file or be transported from one computer to the next via any available mechanism; e.g., a file transfer or a data stream over any network or broadcast mechanism. The actual transport mechanism may be any transport mechanism known to a person of ordinary skill in the art. The present invention can be employed by an external system which invokes the present invention as an embedded mechanism. For example, the present invention can exist as an embedded component of a larger system such as a digital camera system. The digital camera system can invoke the present invention to compress and decompress the digital image data. The digital camera system can store and transmit the present invention's bit stream in combination with other data the digital camera system requires.

In FIG. 21, the Bit Stream Header Information 132 and the Bit Mask Indicators may be configured or organized in any manner as is known to one of ordinary skill in the art. Accordingly, while FIG. 21 shows the Bit Stream Header Information 132 as contiguous with the Bit Mask Indicators, the Bit Stream Header Information 132 is not required to be contiguous with the Bit Mask Indicators. For example, the Bit Stream Header Information 132 and Bit Mask Indicators may be non-contiguous in the same file or may be decoupled from each other such as, inter alia, being located in distinct files. The bit stream, discussed supra, is defined herein to include both the Bit Stream Header Information 132 and the Bit Mask Indicators regardless of how the Bit Stream Header Information 132 and the Bit Mask Indicators are configured or organized.

Figure 22:
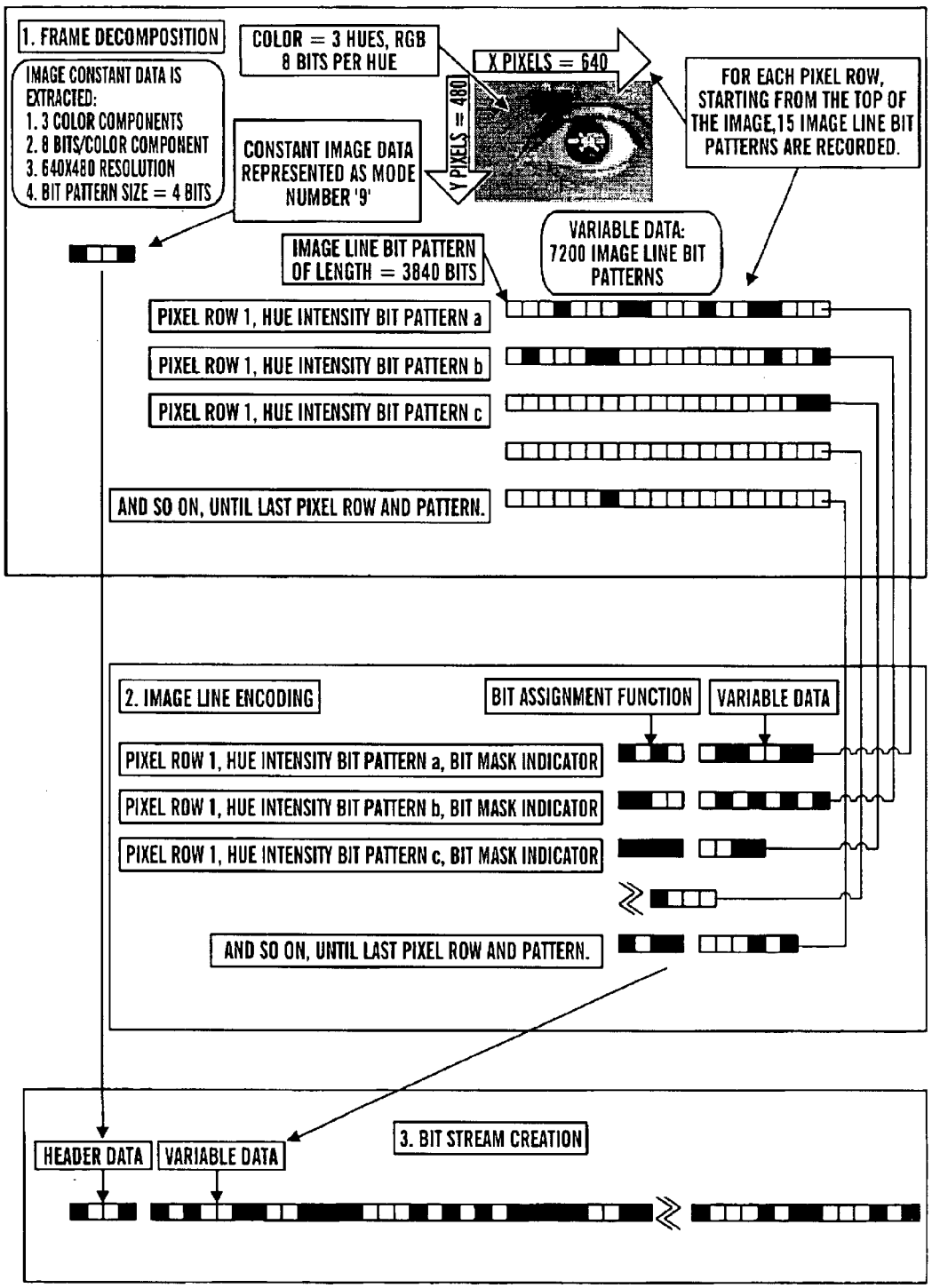
FIG. 22 depicts the compression processes of Frame Decomposition, Image Line Encoding, and Bit Stream Creation, in accordance with embodiments of the present invention.

The compression processes of Frame Decomposition, Image Line Encoding, and Bit Stream Creation are further illustrated in FIG. 22.

As explained supra in conjunction with FIG. 3, the decompression processes include Bit Stream Interpretation, Image Line Decoding, and Frame recreation.

Bit Stream Interpretation

Bit Stream Interpretation is operative after the bit stream 130 of FIG. 21 is transported over a data path (e.g., the data path 18 in FIGS. 1–3) and is thus ready to be decompressed in accordance with FIG. 3. After reading the Bit Stream Header Information 132, the Bit Stream Interpretation interprets the Constant Digital Image Data, and then parses a remaining portion of the bit stream 130 into the first Bit Mask Indicator, the second Bit Mask Indicator, the third Bit Mask Indicator, etc. The bit stream 130 may be received by reading a file or a data stream resulting from any of the transport mechanisms utilized by the implementation of the invention. Bit Stream Creation may be employed by an external system which invokes or embeds the present invention.

The Bit Stream Interpretation parses each Bit Mask Indicator, calculating the length of the Bit Mask Indicator from the values of the Constant Digital Image Data within the Bit Stream Header Information 132 at the beginning of the bit stream 130 and the value of the associated Bit Assignment Function Identifier. For example, the "Global 1's" Bit Assignment Function Identifier has a length of 4 bits that has the value "1000" as discussed supra in conjunction with FIG. 15. The Bit Stream Interpretation will anticipate the next bit in the bit stream 130 to be another Bit Assignment Function Identifier since for the "Global 1's" Bit Assignment Function Identifier contains no Bit Assignment Function Data.

Once the bit stream has been parsed, Image Line Decoding is utilized to recreate the Image Line Bit Patterns.

Image Line Decoding

Image Line Decoding analyzes the Bit Mask Indicator parsed during Bit Stream Interpretation and translates the Bit Mask Indicator into the Image Line Bit Pattern by employing the Bit Assignment Function that was used in conjunction with Image Line Encoding. For example, if the Image Line Bit Pattern was encoded to a Bit Mask Indicator that instructs the use of the "External" Bit Assignment Function, then Image Line Decoding will invoke the "External" Bit Assignment Function with Key Value included within the External Bit Assignment Function Data to reconstruct the Image Line Bit Pattern. Specifically, the "External" Bit Assignment Function will retrieve a specific bit pattern from an external mechanism based upon the Key Value within the "External" Bit Assignment Function Data. This retrieved bit pattern is the Image Line Bit Pattern that the Bit Mask Indicator reproduces. Other Bit Assignment Functions will operate according to their specific requirements and Bit Assignment Function Data.

The Bit Mask Indicators may be translated to Image Line Bit Patterns in the same sequence in Image Line Decoding as the sequence that was used during Frame Decomposition. This sequence ensures that the Image Line Bit Patterns are mapped against the appropriate Hue Intensity Bit Pattern for the correct pixel row within the next step of Frame Recreation.

The Constant Digital Image Data that Image Line Decoding utilizes to calculate the size of each Bit Mask Indicator is either extracted from the Bit Stream Header Information 132 of the bit stream 130 in FIG. 21 or retrieved as default information from a previous invocation of the present invention. This means that this Constant Digital Image Data may not be required in all situations. In situations where the Constant Digital Image Data would be redundant or could be intuited by Bit Stream Interpretation, the Constant Digital Image Data may be reduced or omitted for increased gains in efficiency. An example of this is where the present invention is embedded within a system that always requires the compression of digital image data with identical parameters; pixel dimensions, and number of colors. In this example, it is unnecessary to calculate the lengths of the Bit Mask Indicators, since they will remain constant regardless of the digital images being processed.

Once Image Line Decoding has recreated the Image Line Bit Patterns, Frame Recreation recreates the digital image data.

Frame Recreation

Frame Recreation is the reverse of Frame Decomposition. For example, the Image Line Bit Patterns "a", "b", . . . , "p" for each pixel of FIG. 9 are collapsed into color components and associated color intensities for the pixel, to recreate the digital image based upon the mapping of the Image Line Bit Patterns against the Hue Intensity Bit Patterns and using the definition of the Hue Intensity Bit Patterns (see, e.g., FIG. 8).

Frame Recreation maps the Image Line Bit Patterns to the respective Hue Intensity Bit Patterns, recreating pixel rows that are identical to the pixel rows that were previously decomposed during Frame Decomposition. Since the resulting digital image data from Frame Recreation is exactly the same as the original image data prior to Frame Decomposition, the compression of the present invention is clearly lossless; i.e., the digital image data produced by Frame Recreation exactly duplicates the digital image data processed by Frame Decomposition.

The output of Frame Recreation may be any digital representation of an image or a series of images, such as an image file, a video streaming file, computer video memory, or pixel values from within a computer program. The digital image data produced by Frame Recreation is available for any other processing requirements such as direct video display, further image processing, translation into another graphics file format, and incorporation into other applications.

Uses of the Present Invention

There are many ways to use the present invention such as, inter alia, communication between two computers and embedded usage of the invention.

Figure 23:
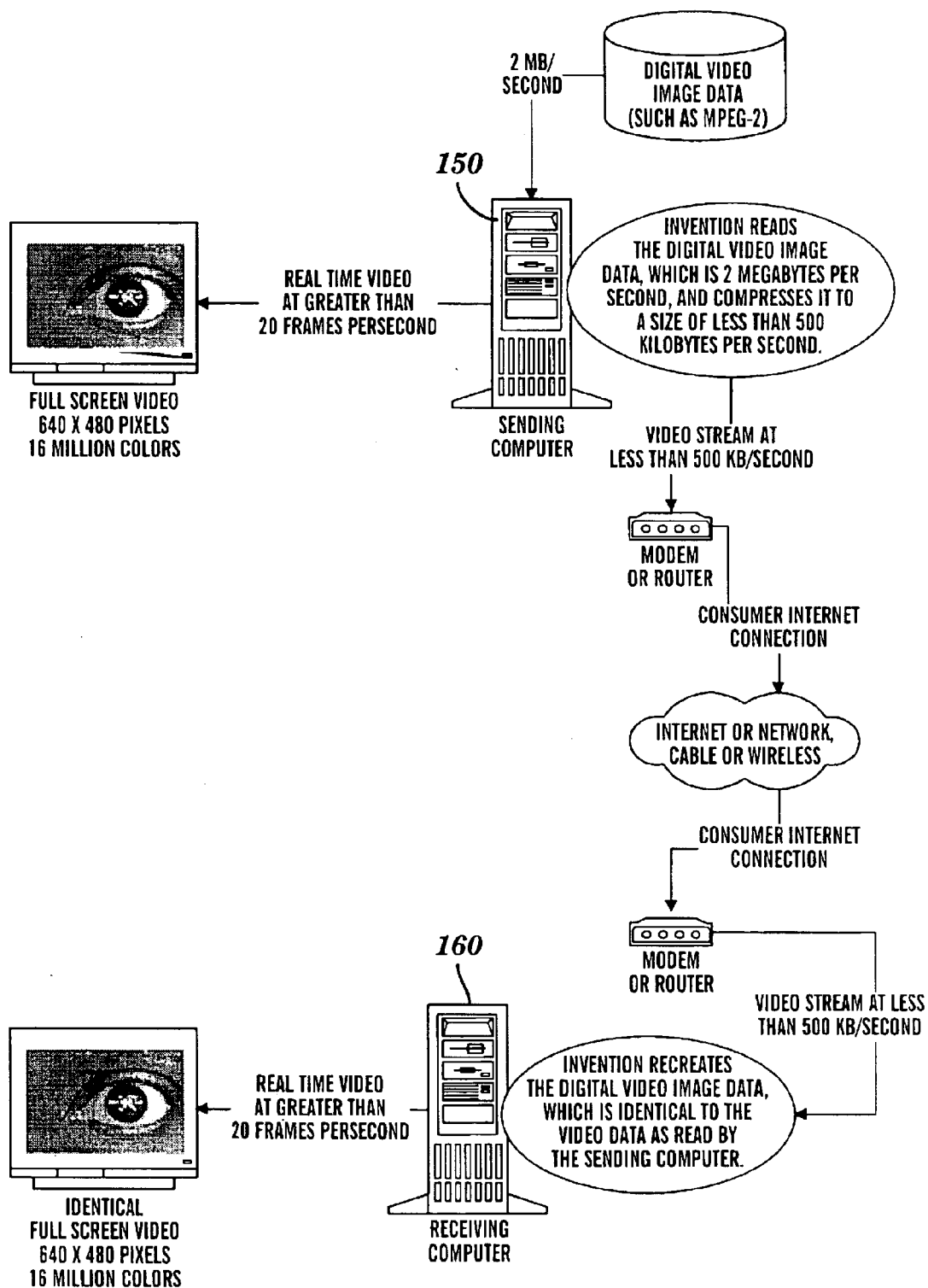
FIG. 23 depicts an example of how the present invention may be utilized fo6 communication between two computers, in accordance with embodiments of the present invention.

As to communication between two computers, FIG. 23 depicts a sending computer 150 and a receiving computer 160 in communication with each other, utilizing full-screen (e.g., 640×480 pixels), smooth-motion (e.g., greater than 20 frames per second), and high-quality video (e.g., 16 million colors) over a consumer-grade Internet connection (e.g., less than 500 Kilobytes/second in real-time). The video image received by the receiving computer 160 will be identical to the video image sent by the sending computer 150. The digital video image data is: read in a standard format (e.g., MPEG-2) at the sending computer 150, sufficiently compressed to be efficiently transported over the low-bandwidth Internet connection, and transmitted to the receiving computer 160. The size of the data stream is less than the available bandwidth of the Internet connection, which enables the sending computer 150 and the receiving computer 160 to communicate in real-time. The present invention reads the bit stream at the receiving computer 160, recreates the identical video data as read by the sending computer 150, and displays the video to the screen coupled to the receiving computer 160.

As to embedded usage of the invention, a digital camera stores and transmits images in a compressed, lossless format, which maximizes the available space within the digital camera's storage medium and minimizes the bandwidth requirements for transmitting the digital image data to another system. The lossless compression and efficient compression ratios for the digital image data enable the digital camera to store and transmit more images without loss in image quality than without the invention.

Figure 24:
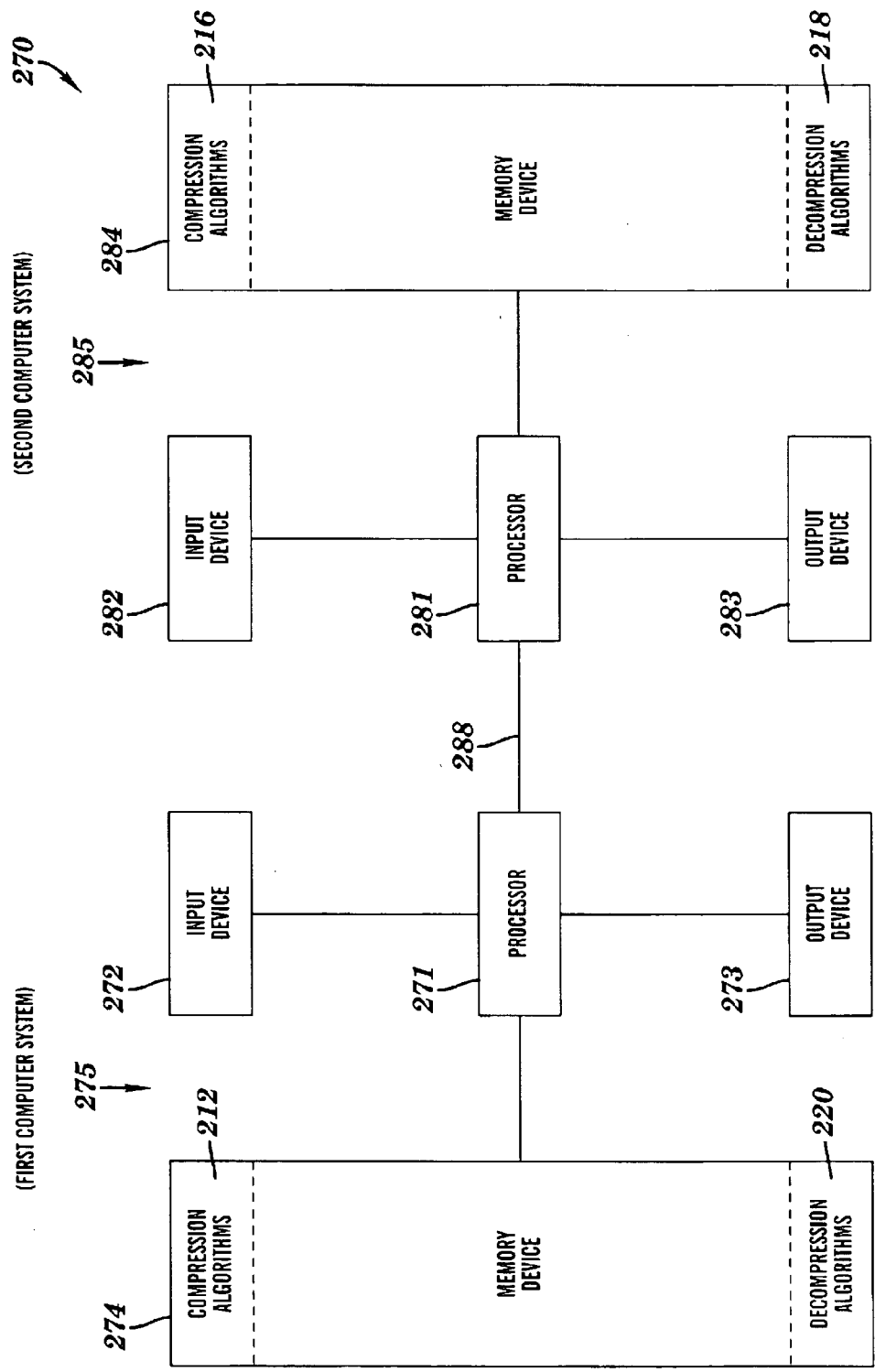
FIG. 24 is a block diagram of a computer network, in accordance with embodiments of the present invention.

FIG. 24 is a block diagram of a computer network 270, in accordance with embodiments of the present invention. The computer network 270 comprises a first computer system 275 and a second computer system 285. The first computer system 275 and a second computer system 285 communicate over a data path 288. The data path 288 is analogous to the data path 18 which was described supra in conjunction with FIGS. 1–3.

The first computer system 275 includes a processor 271, an input device 272 (representing at least one input device) coupled to the processor 271, an output device 233 (representing at least one output device) coupled to the processor 271, and a memory device 274 (representing at least one memory device) coupled to the processor 271. The input device 272 may be, inter alia, a keyboard, a mouse, etc. The output device 273 may be, inter alia, a printer, a plotter, a computer screen, a magnetic tape, a removable hard disk, a floppy disk, etc. The memory device 274 may be, inter alia, a hard disk, a dynamic random access memory (DRAM), a read-only memory (ROM), etc. The memory device 274 stores compression algorithms 212 and decompression algorithms 220. The compression algorithms 212 comprise computer software that implements frame decomposition, image line encoding, and bit stream creation, as shown in FIG. 2 and discussed supra. The memory device 274 includes input data for the compression algorithms 212 and decompression algorithms 220. The memory device 274 may store an array of pixel data (derived from a digital image such as, inter alia, a digital image on a computer screen), said pixel data to be manipulated by the compression algorithms 212 and transmitted over the data path 288 to the second computer system 285 and further manipulated by decompression algorithms 218 at the second computer system 285 to recreate the digital image. The decompression algorithms 220 comprise computer software that implements bit stream interpretation, image line decoding, and frame recreation, as shown in FIG. 3 and discussed supra. The processor 271 executes the compression algorithms 212 and decompression algorithms 220. The output device 273 displays output from compression algorithms 212 and decompression algorithms 220. Additionally, the output device 273 may be used to display output, source code, graphics, etc.

The present invention comprises a computer program product, comprising a computer usable medium having a computer readable program code embodied therein, wherein the computer readable program code includes the compression algorithms 212 and decompression algorithms 220. The memory device 274, or any other such data storage device, may include said computer usable medium.

The second computer system 285 includes a processor 281, an input device 282 (representing at least one input device) coupled to the processor 281, an output device 283 (representing at least one output device) coupled to the processor 281, and a memory device 284 (representing at least one memory device) coupled to the processor 281. The input device 282 may be, inter alia, a keyboard, a mouse, etc. The output device 283 may be, inter alia, a printer, a plotter, a computer screen, a magnetic tape, a removable hard disk, a floppy disk, etc. The memory device 284 may be, inter alia, a hard disk, a dynamic random access memory (DRAM), a read-only memory (ROM), etc. The memory device 284 stores compression algorithms 216 and decompression algorithms 218. The processor 281 executes the compression algorithms 216 and decompression algorithms 218. The compression algorithms 216 comprise computer software that implements frame decomposition, image line encoding, and bit stream creation, as shown in FIG. 2 and discussed supra. The memory device 284 may store an array of pixel data (derived from a digital image such as, inter alia, a digital image on a computer screen), said pixel data to be manipulated by the compression algorithms 216 and transmitted over the data path 288 to the first computer system 275 and further manipulated by decompression algorithms 220 at the first computer system 275 to recreate the digital image. The decompression algorithms 218 comprise computer software that implements bit stream interpretation, image line decoding, and frame recreation, as shown in FIG. 3 and discussed supra. The memory device 284 includes input data for the compression algorithms 216 and decompression algorithms 218. The output device 283 displays output from the compression algorithms 216 and decompression algorithms 218. Additionally, the output device 283 may be used to display output, source code, graphics, etc.

The computer network 270 may function such that the first computer system 275 sends a digital image to the second computer system 285 over the data path 288, wherein the first computer system 275 uses the compression algorithms 212 to create a bit stream representing the digital image in compressed form, and wherein the first computer system 285 uses the decompression algorithms 218 to recreate the digital image in its original form. The computer network 270 may also or alternatively function such that the second computer system 285 sends a digital image to the first computer system 275 over the data path 288, wherein the second computer system 285 uses the compression algorithms 216 to create a bit stream representing the digital image in compressed form, and wherein the first computer system 275 uses the decompression algorithms 220 to recreate the digital image in its original form.

The present invention comprises a computer program product, comprising a computer usable medium having a computer readable program code embodied therein, wherein the computer readable program code includes the compression algorithms 216 and decompression algorithms 218. The memory device 284, or any other such data storage device, may include said computer usable medium.

While FIG. 24 shows the computer network 270 as a particular configuration of hardware and software, any configuration of hardware and software representing a deviation from the computer network 270, as would be known or obvious to a person of ordinary skill in the art who has knowledge of the present invention from the description of the present invention herein, is within the scope of the present invention.

Other Aspects of the Present Invention

While the present invention naturally lends itself to lossless compression, approximation methods may be employed in conjunction with the methods described supra such that compression is lossy rather than lossless. For example, if an Image Line Bit Pattern of 3840 bits has one "1" bit and 3839

"0" bits, one may utilize, inter alia, a "Repeating" Bit Assignment Function with 1 occurrence 104 (see FIG. 17A and accompanying discussion) for lossless compression, or a "Global 0's" Bit Assignment Function (see FIG. 14 and accompanying discussion) as an approximation for lossy compression. Hence the scope of the present invention includes both lossless compression and lossy compression.

While the digital image has been described supra in terms of an embodiment that comprises a two-dimensional array of pixels, the scope of the present invention also includes a three-dimensional array of pixels in orthogonal rectangular coordinates X, Y, and Z, since the three-dimensional array of pixels may be viewed as comprising multiple two-dimensional pixel arrays. For example, if a given three-dimensional array of pixels comprises a 640×480 pixel array in the X-Y plane (i.e., 640 pixels in the X direction and 480 pixels in the Y direction) and 80 pixels in the Z direction, then the given three-dimensional array of pixels may be processed as 80 two-dimensional arrays, wherein each said two-dimensional array may be processed in accordance with the methods described supra. Alternatively, the multiple two-dimensional pixel arrays of the given three-dimensional array may be sequentially processed as a U×640 two-dimensional array, wherein U=38,400 (i.e., 80×480) such that the Image Line Bit Patterns 23 of FIG. 2 comprise 38,400 Image Line Bit Patterns.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. A method for compressing a digital image, comprising:
   providing the digital image in terms of an array of pixels;
   converting the digital image into Image Line Bit Patterns by Frame Decomposition of the array of pixels; and
   independently transforming each Image line Bit Pattern into a corresponding Bit Mask Indicator by Image Line Encoding.

2. The method of claim 1, further comprising generating a bit stream that includes Bit Stream Header Information and the Bit Mask Indicators, wherein the Bit Stream Header Information includes Constant Digital Image Data.

3. The method of claim 2, wherein the Bit Stream Header Information is decoupled from the Bit Mask indicators.

4. The method of claim 1, wherein the independently transforming includes compressing at least one of said Image Line Bit Patterns.

5. The method of claim 4, wherein the compressing results in a compression percent exceeding 90%.

6. The method of claim 4, wherein the compressing is lossless.

7. The method of claim 6, wherein the lossless compressing results in a compression percent exceeding 90%.

8. The method of claim 4, wherein the compressing is lossy.

9. The method of claim 1, wherein each Bit Mask Indicator is independently selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

10. The method of claim 1, wherein at least one Bit Mask Indicator is selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

11. The method of claim 1, wherein the array of pixels comprises a two-dimensional array of pixels.

12. The method of claim 1, wherein the array of pixels comprises a three-dimensional array of pixels.

13. The method of claim 1, wherein each pixel of the array of pixels comprises a color having at least three color components.

14. The method of claim 13, wherein each color component includes $2^B$ color intensities, wherein B is a number of bits allocated to describe each color intensity, wherein the B bits is divided into B/P Hue Intensity Bit Patterns such that each Hue Intensity Bit Pattern comprises P bits selected from $2^P$ unique Hue Intensity Bit Patterns subject to B modulus P=0, wherein $B \geq 1$, and wherein $1 \leq P \leq B$.

15. The method of claim 14, wherein B=8 and P=2.

16. The method of claim 14, wherein the Image Line Bit Patterns include $2^P-1$ Image Line Bit Patterns in each pixel row of the array of pixels.

17. A method for transmitting a digital image from a digital image source to a digital image receiver, comprising:
   providing at the digital image source the digital image in terms of an array of pixels;
   converting the digital image into Image Line Bit Patterns by Frame Decomposition of the array of pixels;
   independently transforming each Image line Bit Pattern into a corresponding Bit Mask Indicator by Image Line Encoding;
   generating a bit stream that includes Bit Stream Header Information and the Bit Mask Indicators, wherein the Bit Stream Header Information includes Constant Digital Image Data;
   transmitting the bit stream over a data path to the digital image receiver;
   parsing the bit stream, including parsing the Bit Mask Indicators;
   translating the Bit Mask Indicators into corresponding Image Line Bit Patterns; and
   restoring the digital image from the Image Line Bit Patterns by Frame Recreation.

18. A system for compressing a digital image, comprising:
   providing the digital image in terms of an array of pixels;
   means for converting the digital image into Image Line Bit Patterns by Frame Decomposition of the array of pixels; and
   means for independently transforming each Image line Bit Pattern into a corresponding Bit Mask Indicator by Image Line Encoding.

19. The system of claim 18, further comprising means for generating a bit stream that includes Bit Stream Header Information and the Bit Mask Indicators, wherein the Bit Stream Header Information includes Constant Digital Image Data.

20. The system of claim 19, wherein the Bit Stream Header Information is decoupled from the Bit Mask indicators.

21. The system of claim 18, wherein the means for independently transforming includes means for compressing at least one of said Image Line Bit Patterns.

22. The system of claim 21, wherein the means for compressing effectuates a compression percent exceeding 90%.

23. The system of claim 21, wherein the means for compressing effectuates lossless compression.

24. The system of claim 23, wherein the lossless compression is characterized by a compression percent exceeding 90%.

25. The system of claim 21, wherein the means for compressing effectuates lossy compression.

26. The system of claim 18, wherein each Bit Mask Indicator is independently selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

27. The system of claim 18, wherein at least one Bit Mask Indicator is selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

28. The system of claim 18, wherein the array of pixels comprises a two-dimensional array of pixels.

29. The system of claim 18, wherein the array of pixels comprises a three-dimensional array of pixels.

30. The system of claim 18, wherein each pixel of the array of pixels comprises a color having at least three color components.

31. The system of claim 30, wherein each color component includes $2^B$ color intensities, wherein B is a number of bits allocated to describe each color intensity, wherein the B bits is divided into B/P Hue Intensity Bit Patterns such that each Hue Intensity Bit Pattern comprises P bits selected from $2^P$ unique Hue Intensity Bit Patterns subject to B modulus P=0, wherein $B \geq 1$, and wherein $1 \leq P \leq B$.

32. The system of claim 31, wherein B=8 and P=2.

33. The system of claim 31, wherein the Image Line Bit Patterns include $2^P-1$ Image Line Bit Patterns in each pixel row of the array of pixels.

34. A system for compressing a digital image, comprising:
a digital image source adapted to generate the digital image in terms of an array of pixels; and
compression algorithms adapted to convert the digital image into Inage Line Bit Patterns by Frame Decomposition of the array of pixels and to independently transform each Inage line Bit Pattern into a corresponding Bit Mask Indicator by Image Line Encoding.

35. The system of claim 34, wherein the compression algorithms are further adapted to generate a bit stream that includes Bit Stream Header Information and the Bit Mask Indicators, and wherein the Bit Stream Header Information includes Constant Digital Image Data.

36. The system of claim 35, wherein the Bit Stream Header Information is decoupled from the Bit Mask indicators.

37. The system of claim 34, wherein to independently transform each Image line Bit Pattern includes to compress at least one of said Image Line Bit Patterns.

38. The system of claim 37, wherein to compress effectuates a resulting compression percent that exceeds 90%.

39. The system of claim 37, wherein to compress includes to effectuate lossless compression.

40. The system of claim 39, wherein to effectuate lossless compression includes to effectuate a resulting compression percent that exceeds 90%.

41. The system of claim 37, wherein to compress includes to effectuate lossy compression.

42. The system of claim 34, wherein each Bit Mask Indicator is independently selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

43. The system of claim 34, wherein at least one Bit Mask Indicator is selected from the group consisting of a Default Bit Mask Indicator, a Global 0's Bit Mask Indicator, a Global 1's Bit Mask Indicator, an External Bit Mask Indicator, a Repeating Bit Mask Indicator, and a Recurring Bit Mask Indicator.

44. The system of claim 34, wherein the array of pixels comprises a two-dimensional array of pixels.

45. The system of claim 34, wherein the array of pixels comprises a three-dimensional array of pixels.

46. The system of claim 34, wherein each pixel of the array of pixels comprises a color having at least three color components.

47. The system of claim 46, wherein each color component includes $2^B$ color intensities, wherein B is a number of bits allocated to describe each color intensity, wherein the B bits is divided into B/P Hue Intensity Bit Patterns such that each Hue Intensity Bit Pattern comprises P bits selected from $2^P$ unique Hue Intensity Bit Patterns subject to B modulus P=0, wherein $B \geq 1$, and wherein $1 \leq P \leq B$.

48. The system of claim 47, wherein B=8 and P=2.

49. The system of claim 47, wherein the Image Line Bit Patterns include $2^P-1$ Image Line Bit Patterns in each pixel row of the array of pixels.

* * * * *

UNITED STATES PATENT AND TRADEMARK OFFICE
CERTIFICATE OF CORRECTION

PATENT NO. : 6,898,311 B2
DATED : May 24, 2005
INVENTOR(S) : Jeffrey A. Whitehead It is certified that error appears in the above-identified patent and that said Letters Patent is hereby corrected as shown below:

Column 4,
Line 46, delete "fo6" and insert -- for --

Column 23,
Lines 40 and 42, delete "inage" and insert -- image --

Signed and Sealed this

Nineteenth Day of July, 2005

JON W. DUDAS
*Director of the United States Patent and Trademark Office*